United States Patent
Sigron et al.

(10) Patent No.: US 8,977,136 B2
(45) Date of Patent: Mar. 10, 2015

(54) CARRIER PHASE ESTIMATION FOR OPTICALLY COHERENT QPSK BASED ON WIENER-OPTIMAL AND ADAPTIVE MULTI-SYMBOL DELAY DETECTION (MSDD)

(71) Applicants: Netta Sigron, Haifa, IL (US); Igor Tselniker, Haifa, IL (US); Moshe Nazarathy, Haifa, IL (US)

(72) Inventors: Netta Sigron, Haifa, IL (US); Igor Tselniker, Haifa, IL (US); Moshe Nazarathy, Haifa, IL (US)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 13/719,287

(22) Filed: Dec. 19, 2012

(65) Prior Publication Data
US 2014/0050493 A1 Feb. 20, 2014

Related U.S. Application Data

(60) Provisional application No. 61/577,107, filed on Dec. 19, 2011.

(51) Int. Cl.
| | | |
|---|---|---|
| H04B 10/06 | (2006.01) | |
| H04B 10/61 | (2013.01) | |
| H04L 27/20 | (2006.01) | |
| H04L 27/227 | (2006.01) | |
| H04L 27/38 | (2006.01) | |
| H04L 27/00 | (2006.01) | |

(52) U.S. Cl.
CPC ........ *H04B 10/6165* (2013.01); *H04L 27/2075* (2013.01); *H04L 27/227* (2013.01); *H04L 27/3827* (2013.01); *H04L 2027/0067* (2013.01)
USPC .......................................... 398/203; 398/204

(58) Field of Classification Search
USPC ................................................. 398/202–214
See application file for complete search history.

(56) References Cited

U.S. PATENT DOCUMENTS

| | | | | |
|---|---|---|---|---|
| 8,041,233 B2* | 10/2011 | Hueda et al. | ................... | 398/208 |
| 8,385,747 B2* | 2/2013 | Roberts et al. | ................ | 398/150 |
| 2008/0025733 A1* | 1/2008 | Nazarathy et al. | ............ | 398/209 |
| 2009/0208224 A1* | 8/2009 | Kikuchi | ........................ | 398/141 |
| 2010/0177815 A1* | 7/2010 | Garg et al. | ..................... | 375/231 |
| 2010/0322637 A1* | 12/2010 | Hayee et al. | ................... | 398/158 |

* cited by examiner

*Primary Examiner* — David Payne
*Assistant Examiner* — Casey Kretzer
(74) *Attorney, Agent, or Firm* — Oren Reches

(57) ABSTRACT

A receiver that includes a carrier recovery module that includes a reference signal generator that is arranged to generate a reference signal that estimates a carrier signal; a decision module that is arranged to demodulate a receiver input signal by the reference signal to provide a demodulated signal and to evaluate the demodulated signal to provide an decision module output signal that estimates the carrier signal; the reference signal generator includes a delay and rotation module that is arranged to delay receiver input signals to provide delayed receiver input signals and to align the delayed receiver input signals by a rotation that is responsive to the decision module output signal thereby providing aligned signals; and a multiplication and summation module that is arranged to generate the reference signal by calculating a weighted sum of the aligned signals.

28 Claims, 18 Drawing Sheets

CARRIER PHASE ESTIMATION FOR OPTICALLY COHERENT QPSK BASED ON WIENER-OPTIMAL AND ADAPTIVE MULTI-SYMBOL DELAY DETECTION (MSDD)

RELATED APPLICATIONS

This patent application claims priority from U.S. provisional patent Ser. No. 61/577,107 filing date Dec. 19, 2011 which is incorporated herein by reference.

BACKGROUND

The prior art may be disclosed in some of the following publications. In the specification a prior art reference will be addresses by referring to the number of that prior art reference in the list. For example the first prior art reference in the list will be referred to as [1]:
1. A. Viterbi, "Nonlinear estimation of PSK-modulated carrier phase with application to burst digital transmission," IEEE Transactions on Information Theory, 29, 543-551 (1983).
2. E. Ip and J. M. Kahn, "Carrier synchronization for 3- and 4-bit-per-Symbol optical transmission," J. Lightwave Technol., 23, 4110-4124 (2005).
3. R. Noé, "PLL-free synchronous QPSK polarization multiplex/diversity receiver concept with digital I & Q baseband processing," Photon. Technol. Lett., 17, 2004-2006 (2005).
4. M. G. Taylor, "Accurate digital phase estimation process for coherent detection using a parallel digital processor," in, ECOC'05 European Conf. of Optical Communication, Tu 4.2.6 (2005).
5. E. Ip and J. M. Kahn, "Feedforward carrier recovery for coherent optical communications," J. Lightwave Technol., 25, 2675-2692 (2007).
6. S. Hoffmann et al., "Frequency and phase estimation for coherent QPSK transmission with unlocked DFB lasers," Photon. Technol. Lett., 20, 2008-2010 (2008).
7. M. G. Taylor, "Detection using digital signal processing," J. Lightwave Technol., 27, 901-914 (2009).
8. M. G. Taylor, "Algorithms for coherent detection What can we learn from other fields?," in OFC/NFOEC'10, Conf. on Optical Fiber Communication, OThL4 (2010).
9. M. G. Taylor, "Phase estimation methods for optical coherent detection using digital signal processing," J. Lightwave Technol., 27, 901-914 (2009).
10. K. Piyawanno, M. Kuschnerov, B. Spinnler, and B. Lankl, "Low complexity carrier recovery for coherent QAM using superscalar parallelization," in ECOC'10 European Conf. of Optical Communication, We.7.A.3 (2010)
11. D. Divsalar and M. K. Simon, "Multiple-symbol differential detection of MPSK," IEEE Trans. Comm., 38, 300-308 (1990).
12. F. Edbauer, "Bit error rate of binary and quaternary DPSK signals with multiple differential feedback detection," IEEE Trans. Comm., 40, 457-460 (1992).
13. M. Adachi and F. Sawahashi, "Decision feedback multiple-symbol differential detection for M-ary DPSK," Electron. Lett., 29, 1385-1387 (1993).
14. F. Adachi and M. Sawahashi, "Decision feedback differential phase detection of M-ary DPSK signals," IEEE Trans. Vehicular Technol., 44, 203-210 (1995).
15. S. Zhang, P. Y. Kam, J. Chen, and C. Yu, "Decision-aided maximum likelihood detection in coherent optical phase-shift-keying system," Optics Express, 17, 703-715 (2009).
16. C. Yu, S. Zhang, P. Y. Kam, and J. Chen, "Bit-error rate performance of coherent optical M-ary PSK/QAM using decision-aided maximum likelihood phase estimation," Optics Express, 18, 12088-103 (2010).
17. S. Zhang, P.-yuen Kam, C. Yu, and J. Chen, "Decision-aided carrier phase estimation for coherent optical communications," J. Lightwave Technol., 28, 1597-1607 (2010).
18. D. van den Borne, S. Calabro, S. L. Jansen, E. Gottwald, G. D. Khoe, and H. de Waardt, "Differential quadrature phase shift keying with close to homodyne performance based on multi-symbol phase estimation," in OFC'05 Conference on Optical Fiber Communication (2005).
19. M. Nazarathy and Y. Yadin, "Approaching coherent homodyne performance with direct detection low-complexity advanced modulation formats," in COTA'06 Coherent Optical Technologies and Applications (2006).
20. X. Liu, "Data-Aided Multi-Symbol Phase Estimation for Receiver Sensitivity Enhancement in Optical DQPSK, CThB4," in COTA'06 Coherent Optical Techniques and Applications (2006).
21. M. Nazarathy and Y. Atzmon, "Approaching coherent homodyne performance with direct detection low-complexity advanced modulation formats," in COTA'08 Coherent Optical Techniques and Applications (2008).
22. X. Liu, S. Chandrasekhar, and A. Leven, "Digital self-coherent detection," Optics Express, 16, 792-803 (2008).
23. M. Nazarathy, X. Liu, L. Christen, Y. K. Lize, and A. E. Willner, "Self-Coherent Multisymbol Detection of Optical Differential Phase-Shift Keying," J. Lightwave Technol., 26, 1921-1934 (2008).
24. Y. Takushima, H. Y. Choi, and Y. C. Chung, "Transmission of 108-Gb/s PDM 16ADPSK signal on 25-GHz grid using non-coherent receivers," Optics Express, 17, 13458-66 (2009).
25. J. Li et al., "Self-coherent receiver for PoIMUX coherent signals," in OFC'11 Conf. on Optical Fiber Communication, OWV5 (2011).
26. N. Kikuchi and S. Sasaki, "Highly sensitive optical multilevel transmission of arbitrary quadrature-amplitude modulation (QAM) signals with direct detection," J. Lightwave Technol., 28, 123-130 (2010).
27. N. Kikuchi, "Chromatic dispersion-tolerant higher-order multilevel transmission with optical delay detection," in SPPCom'11 Signal Processing in Photonic Communications—OSA Technical Digest (2011).
28. S. Adhikari et al., "Self-coherent optical OFDM: an interesting alternative to direct or coherent detection" in ICTON'11 13th International Conference on Transparent Optical Networks (2011).
29. S. Kumar, Impact of Nonlinearities on Fiber Optic Communications, (Springer, 2011).
30. N. Sigron, I. Tselniker, M. Nazarathy, A. Gorshtein, D. Sadot, and I. Zelniker, "Ultimate single-carrier recovery for coherent detection," in OFC'11 Conference on Optical Fiber Communication, OMJ2 (2011).
31. M. Nazarathy, N. Sigron, and I. Tselniker, "Integrated carrier phase and frequency estimation for coherent detection based on multi-symbol differential detection (MSDD)," in SPPCom'11 Signal Processing in Photonic Communications—OSA Technical Digest, Invited paper SPMC1 (2011).
32. N. Kikuchi, S. Sasaki, and T. Uda, "Phase-noise tolerant coherent polarization-multiplexed 16 QAM Transmission with digital delay-detection, in ECOC'11 European Conference of Optical Communication (ECOC), Tu.3.A (2011).
33. T. Adali and S. Haykin, Adaptive signal processing—next generation solutions, (John Wiley, 2010).
34. W. Shieh and K.-po Ho, "Equalization-enhanced phase noise for coherent-detection systems using electronic digital signal processing," Optics Express, 16, 15718-15727 (2008).
35. Y. Atzmon and M. Nazarathy, "A gaussian polar model for error rates of differential phase detection impaired by linear, nonlinear, and laser phase noises," J. Lightwave Technol., 27, 4650-4659 (2009).

SUMMARY OF THE INVENTION

There may be provided a receiver that may include one or more carrier recovery modules, wherein a carrier recovery module may include: a port arranged to receive a receiver input signal that is representative of an optically coherent signal that was received by the receiver as a result of a transmission, by an optical transmitter, of a transmitter signal that is a carrier signal that is being modulated by information; a reference signal generator that may be arranged to generate a reference signal that estimates the carrier signal; a decision module that may be arranged to demodulate the receiver input signal by the reference signal to provide a demodulated signal and to evaluate the demodulated signal to provide an decision module output signal that estimates the carrier signal; wherein the reference signal generator may include: a delay and rotation module that may be arranged to delay receiver input signals to provide delayed receiver input signals and to align the delayed receiver input signals by a rotation that is responsive to the decision module output signal thereby providing aligned signals; and a multiplication and summation module that may be arranged to generate the reference signal by calculating a weighted sum of the aligned signals.

The decision module may be a slicer.

The decision module may include a normalizing module that may be arranged to normalize the decision output signal to provide a normalized output signal signals that is used to rotate at least some of the delayed receiver input signals.

The multiplication and summation module may include multiple adders; and only a single multiplier; wherein the multiple adders are arranged to add the aligned signals to provide an first sum and wherein the single multiplier may be arranged to multiply the first sum by a single coefficient to provide the weighted sum of the aligned signals. The single coefficient may equal 1/L, wherein L is a number of the aligned signals.

The multiplication and summation module may include less than L multipliers, wherein L is a number of the aligned signals.

The multiplication and summation module may include multipliers that are arranged to multiply the aligned signals by coefficients.

The receiver may include a coefficient calculator that may be arranged to calculate the coefficients.

The coefficient calculator is fed by the decision module output signal.

The coefficient calculator may be arranged to calculate the coefficients by applying a Wiener optimization process.

The coefficient calculator may be arranged to calculate the coefficients by applying a least mean square error optimization process.

The coefficient calculator may be arranged to calculate a current value of a certain coefficient, the certain coefficient is to be multiplied by a certain aligned signal, in response to a last value of the certain coefficient, a value of the certain aligned signal and a certain delayed receiver input signal that is associated with the certain aligned signal.

The receiver may include an input module, an output module and multiple carrier recovery modules coupled between the input and output modules; wherein the input module may be arranged to receive a sequence of receiver input signals and to send to each of the multiple carrier recovery modules a sub-sequence of receiver input signals; wherein the multiple carrier recovery modules are arranged to output decision module output signals; and wherein the output module may be arranged to receive the decision module output signals from the multiple carrier recovery modules and to output a sequence of decision module output signals.

Each sub-sequence of receiver input signals may include at least one thousand consecutive input receiver signals.

There may be provided a method for carrier recovery, the method may include: receiving a receiver input signal that is representative of an optically coherent signal that was received by the receiver as a result of a transmission, by an optical transmitter, of a transmitter signal that is a carrier signal that is being modulated by information; generating, by a reference signal generator, a reference signal that estimates the carrier signal; demodulating the receiver input signal by the reference signal to provide a demodulated signal; evaluating the demodulated signal, by a decision module, to provide an decision module output signal that estimates the carrier signal; wherein the generating of the reference signal may include: delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal.

There may be provided a non-transitory computer readable medium that stores instructions to be executed by a receiver, the instructions are for: receiving a receiver input signal that is representative of an optically coherent signal that was received by the receiver as a result of a transmission, by an optical transmitter, of a transmitter signal that is a carrier signal that is being modulated by information; generating, by a reference signal generator, a reference signal that estimates the carrier signal; demodulating the receiver input signal by the reference signal to provide a demodulated signal; evaluating the demodulated signal, by a decision module, to provide an decision module output signal that estimates the carrier signal; wherein the generating of the reference signal may include: delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal.

The decision module may be a slicer.

The method according to claim may include normalizing, by a normalizing module of the decision circuit, the decision output signal to provide a normalized output signal signals that is used to rotate at least some of the delayed receiver input signals.

The method according to claim wherein the calculating of the weighted sum may include adding the aligned signals to provide an first sum and multiplying the first sum by a single coefficient to provide the weighted sum of the aligned signals.

The single coefficient may equal 1/L, wherein L is a number of the aligned signals.

The multiplication and summation module may include less than L multipliers, wherein L is a number of the aligned signals.

The calculating of the weighted sum may include multiplying the aligned signals by coefficients.

The method may include calculating, by a coefficient calculator, the coefficients.

The calculating of the coefficients may include receiving the decision module output signal.

The calculating of the coefficients may include applying a Wiener optimization process.

The calculating of the coefficients may include applying a least mean square error optimization process.

The calculating of the coefficients may include calculating a current value of a certain coefficient, the certain coefficient is to be multiplied by a certain aligned signal, in response to a last value of the certain coefficient, a value of the certain aligned signal and a certain delayed receiver input signal that is associated with the certain aligned signal.

The method may include: receiving by an input module a sequence of receiver input signals; sending to send to each of carrier recovery module of multiple carrier recovery modules a sub-sequence of receiver input signals; outputting, by the multiple recovery modules, decision module output signals to an output module; and outputting by the output module, a sequence of decision module output signals.

Each sub-sequence of receiver input signals may include at least one thousand consecutive input receiver signals.

BRIEF DESCRIPTION OF THE DRAWING

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
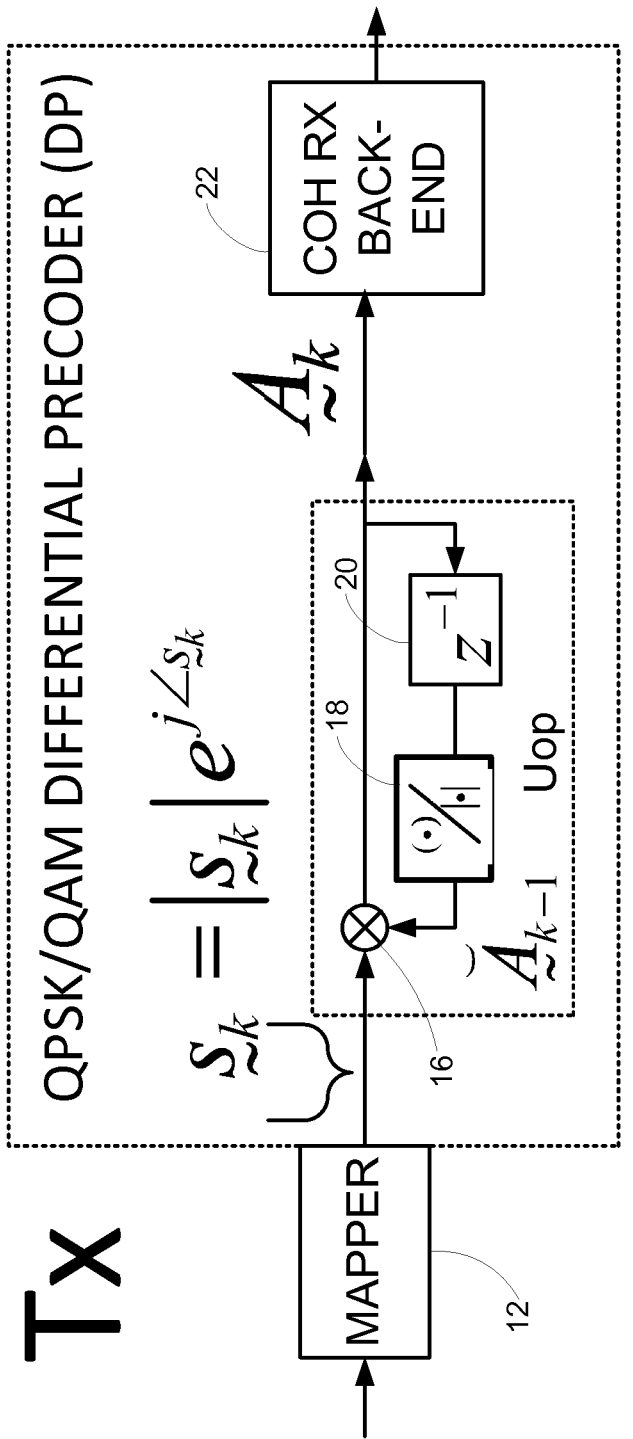
FIG. 1 illustrates a transmitter according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

Carrier Recovery

Carrier Recovery (CR) is a critical component in modern DSP-oriented coherent receivers (Rx) for 100-400 G transmission and beyond. Multiple carrier phase estimation (CPE) methods have been heretofore considered for QPSK transmission, among them [1-10]. One of the most popular CPE techniques for QPSK coherent detection is the Viterbi&Viterbi algorithm [1], which is conceptually elegant, yet suffers from phase wrap-around effects, cycle slips and noise enhancement due to the non-linear M-th power and scaled argument extraction operations.

The Multi-Symbol-Delay Detection (MSDD) carrier phase estimation technique is derived here for optically coherent QPSK transmission, introducing the principle of operation while providing intuitive insight in terms of a multi-symbol extension of nave delay-detection. We derive here for the first time Wiener-optimized and LMS-adapted versions of MSDD, introduce simplified hardware realizations, and evaluate complexity and numerical performance tradeoffs of this highly robust and low-complexity carrier phase recovery method. A multiplier-free carrier phase recovery version of the MSDD provides nearly optimal performance for linewidths up to ~0.5 MHz, whereas for wider linewidths, the Wiener or LMS versions provide optimal performance at about 9 taps, using 1 or 2 complex multipliers per tap.

There is provided a novel carrier recovery (CR) technique for QPSK optically coherent links, based on Multi-Symbol-Delay Detection (MSDD), called Multi-Symbol-Differential Detection (also with MSDD acronym) in the wireless literature, alternatively referred to by the synonym term Multi-Symbol-Phase Estimation (MSPE) which was also used in photonic applications.

Historically, MSDD was introduced in the electrical communications context more than two decades ago [11-14]. More recently, the MSDD method was applied to carrier phase estimation for coherent receivers under the name Maximum Likelihood Phase Estimation, by a group from the National Univ. of Singapore [15-17]. While those works applied the MSDD technique to coherent optical detection, prior applications of MSDD were already introduced in optical communication by multiple groups since 2005, in the related context of self-coherent detection (coherent-grade incoherent detection without a local oscillator) [18-28], on which topic a review chapter recently appeared in [29]. Our interest here is MSDD for coherent rather than incoherent or self-coherent detection, but it should be mentioned that the mathematics of self-coherent and coherent MSDD are formally similar. The applicability of MSDD to coherent detection was recently previewed in our brief expositions [30], [31] which explored applications to both QPSK and QAM coherent receivers. N. Kikuchi et al also recently ported their self-coherent or incoherent detection MSDD approach (called in their language "delay detection") to the realization of a CR sub-system for coherent detection [32].

It turns out that, beyond QPSK, our MSDD methodology is also applicable to QAM coherent detection, as well as to carrier frequency offset (CFO) estimation in addition to phase estimation. Nevertheless, for ease of exposition of the initial concept, in this work we focus exclusively on thoroughly deriving and explaining MSDD carrier phase estimation (CPE) principle for QPSK coherent detection, relegating to a future publication the additional MSDD extensions to QAM and to CFO tracking and correction. The MSDD CPE method is theoretically derived and simulated here in the QPSK transmission context, however we emphasize that our method is actually "QAM-ready"—the block diagrams developed here will function for QAM as well, however QAM extensions our outside the QPSK-oriented paper scope.

We aim to establish MSDD as a preferred alternative for accurate yet simple QPSK carrier phase estimation and correction. Unlike prior methods, our MSDD method is optimal in the Minimum-Mean-Square-Error (MMSE) sense, in the wake of channel statistics consisting of a combination of ASE-induced phase noise (PN) and laser phase noise (LPN), i.e. the MSDD CR will exhibit the best possible OSNR performance and tolerance to laser linewidth (LW). The adaptive LMS version, as derived here in detail for the first time, requires no prior knowledge of channel statistics—it learns the channel whatever the relative strengths of ASE and LPN (OSNR vs. LW) are, automatically adjusting the taps for optimal performance.

Notice that we inevitably require multiple, L, taps in order to suppress the phase noise by an effective averaging effect. The computational complexity of our optimized algorithm is about one complex multiplier (CM) per tap for the Wiener-optimal version with fixed coefficients and about 2 CMs per tap for the LMS-adaptive version. However, at the expense of slight (or in some cases negligible) reduction in performance, if we give up optimized coefficients but rather make all tap coefficients equal to unity, we obtain an MSDD variant of ultimate simplicity: The CPE becomes multiplier-free. This version has negligible performance penalty relative to a fully optimized MSDD, in the prevalent scenario that for coherent-grade lasers with 100 KHz linewidth are used in the transmitter and for LO, and even up to 0.5 MHz linewidth for a parallelization factor of 16. In addition to performance and complexity metrics, we should also mention that the MSDD CR method is robust, providing uninterrupted operation, as MSDD processing is essentially linear time-varying, rather than non-linear, thus cycle slips and other non-linear phase-wrapping artifacts of the competing leading M-power (Viterbi&Viterbi) method for QPSK CR, are completely eliminated.

The paper is structured as follows: Section 2 reviews generic CR concepts and discusses the naïve Delay Detector (DD), which is extended in section 3 to the more advanced MSDD concept, explaining the MSDD principle of operation. Section 4 develops a Wiener filtering solution, optimizing the MSDD coefficients for a channel affected by both ASE-induced and laser source phase-noises. In Section 5 we derive an LMS adaptive algorithm for the MSDD coefficients. Section 6 introduces efficient implementations and evaluates computational complexity of the MSDD. Two hardware structures are derived: a very low complexity multiplier-free CPE which is non-adaptive and non-optimized (but displays nearly optimal performance for low linewidths) and a more complex optimally performing Wiener or LMS-adaptive version. Section 7 develops the polyphase hardware parallelization of the MSDD. Section 8 presents numeric simulation performance results and Section 9 concludes the paper.

Appendix A reviews some differential precoding mathematical properties, Appendix B details the derivation of the Wiener optimal solution and Appendix C collects the relevant abbreviations used in this paper.

Carrier Recovery (CR) Concepts—Naïve Delay Detector (DD)

2.1 Differential Precoding

Differential precoding is used in Direct Detection Differential Phase Shift Keying (DPSK) systems, yet here we are interested in CR for coherent rather than direct detection. Our motivation for reviewing and expanding the DP concept is that MSDD carrier recovery may be viewed as a generalization of DPSK, retaining some of the DPSK advantages while overcoming the sensitivity disadvantage of DPSK. A coherent QPSK transmitter (Tx) intended to operate with an MSDD based receiver (Rx), should include a Differential Precoder (DP) (FIG. 1). Each information symbol, as selected out of the QPSK complex alphabet, is mapped into a line symbol from the same alphabet, $A_k \in \{A, jA, -A, -jA\}$, according to following recursion which defines the DP mapping:

$$|A_k|=|A_{k-1}|=A; \angle A_k = \angle s_k + \angle A_{k-1} \Leftrightarrow \angle s_k = \angle A_k - \angle A_{k-1} \quad (1)$$

The line symbols $A_k$ generated at the DP output are pulse-shaped and optically transmitted.

The DP recursion (1) amounts to an additive accumulator in the phase domain: The QPSK information phase $\angle s_k$ sets the difference between two successive phases of the line symbols, i.e. information is encoded in the phase differences transmitted on the line.

A more mathematically abstract formulation of the DP, amenable to generalizing the current QPSK MSDD to a higher-order QAM constellation, is obtained in terms of the following unimodular normalization operation, referred to as "Uop", $$\check{z} \equiv U\{z\} \equiv z/|z| = e^{j\angle z} = \sqrt{z/z^*} \quad (2)$$

which normalizes a given phasor (complex-number $z$) into a unimodular output phasor (unimodular means unity modulus, $|\check{z}|=1$), retaining the same angle (argument): $\angle \check{z} = \angle z$.

A modulus-preserving differential precoder (MP-DP) applicable to both QPSK and QAM was proposed by N. Kikuchi [26]. In the polar domain this MP-DP is described as accumulating the phase, $$\angle A_k = \sum_{m=0}^{k} \angle S_m$$

while preserving the modulus, $|A_k|=|s_k|$. In the Uop based complex notation, the MP-DP is compactly represented as $A_k = s_k \check{A}_{k-1}$:

$$A_k = s_k \check{A}_{k-1} \Leftrightarrow |A_k|=|s_k| \text{ and } \angle A_k = \angle s_k + \angle A_{k-1}. \quad (3)$$

FIG. 1. QPSK/QAM transmitter scheme with (modulus-preserving) differential precoder, compatible with a MSDD-based receiver.

Here we prefer to express Kikuchi's MP-DP description, originally expressed in the polar (magnitude and phase) domain, in the more abstract equivalent form $A_k = s_k \check{A}_{k-1}$, formulated terms of the Uop. The mathematics of the Uop and MP-DP modules are developed in Appendix A.

In this paper our exclusive focus is on QPSK coherent transmission. It is readily verified that the MP-DP transformation, (3), generally applicable to QAM, reduces to (1) in the special case of a QPSK constellation, wherein $|s_k|=A$. Henceforth, for brevity, we use the term DP in the sense of MP-DP (such as in FIG. 1). Resorting to the complex description for the DP will facilitate of mean-square optimal MSDD coefficients derivation in section 4.

FIG. 1 illustrates a transmitter 10 that includes a mapper 12 that is followed by a multiplier 16, a coherent receiver backend 22 and a feedback branch that includes delay unit 22 and a Uop normalizer 18 having an output that is also provided to the multiplier 16.

Figure 2:
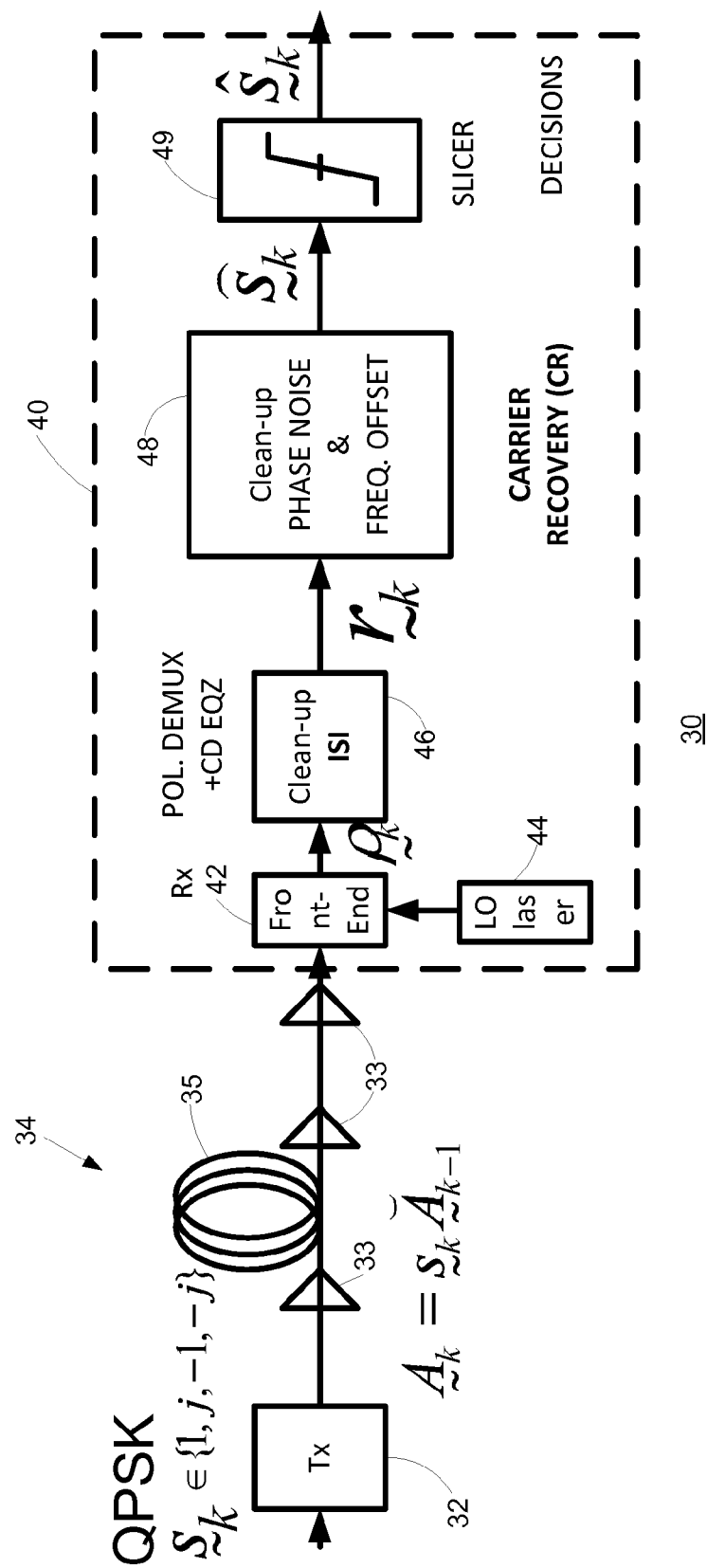
FIG. 2 illustrates a link model according to an embodiment of the invention.

FIG. 2. Link model including the Carrier Recovery System. The model includes transmitter 32, medium 34 that include finer 35 and amplifiers 33 and a receiver 40 that includes receiver front end 42, local oscillator 44, clean up ISI (inter symbol interference) module 46, carrier recovery module 48 for cleaning up phase noise and frequency offset and a slicer 49.

2.2 Link Model Including the CR

The QPSK Tx (FIG. 2) comprises a DP, generating the line symbols $A_k$, differentially precoded as per (3). In the coherent Rx, our interest is in the carrier recovery module, the role of which is to "clean up" phase noise and frequency offsets. This paper is devoted to the specific MSDD embodiment of the CR. The input complex samples are assumed to have been polarization-demultiplexed and are essentially free of Inter-Symbol-Interference (ISI), but evidently still carry phase noise, which is to be mitigated by the CR:

$$r_k = A_k e^{j\phi_k^{LPN}} e^{j\theta_k} + n_k \quad (4)$$

where $\phi_k^{LPN}$ are the samples of the laser phase noise (LPN), $e^{j\theta_k}$ describes the spinning of the constellation due to laser frequency offset (FO), and is additive circularly symmetric white Gaussian noise, due to Amplified Spontaneous Emission (ASE) (possibly also including other smaller white noise contributions such as the ADC quantization and thermal noise). In this paper we do not further consider the FO impairment, but rather exclusively focus on phase noise mitigation, thus (4) reduces to the simple memoryless channel model $$r_k = A_k e^{j\phi_k^{LPN}} + n_k = A_k p_k; \quad (5)$$

$$p_k \equiv (1 + \eta_k) e^{j\phi_k^{LPN}};$$

$$\eta_k \equiv e^{j\phi_k^{LPN}} n_k / A_k$$

with the LPN $\phi_k^{LPN}$ given by Wiener-Levy (LPN) random process, accumulating independent gaussian phase noise increments:

$$\phi_k^{LPN} = \sum_{m=0}^{k} \Omega_m; \ \Omega_m \sim N[0, 2\pi\Delta\nu T]; \ \langle \Omega_m \Omega_n \rangle \quad (6)$$

$$= 2\tau\Delta\hat{\nu}\delta_{m-n}$$

with T the sampling interval and the normalized combined lasers linewidth. The normalized angular ASE noise introduced in (5) is also circular Gaussian, with scaled-down variance $\sigma_\eta \equiv \sigma_n/|A|^2$. The total phase noise effect is compactly encapsulated in the PN multiplicative noise sequence $p_k$ comprising LPN and ASE additive contributions:

$$p_k \equiv (1 + \eta_k) e^{j\phi_k^{LPN}} = |1 + \eta_k| e^{j\phi_k^{ASE}} e^{j\phi_k^{LPN}} \cong e^{j\phi_k}; \quad (7)$$

$$\phi_k = \phi_k^{LPN} + \phi_k^{ASE}; \phi_k^{ASE} = \angle(1 + \eta_k).$$

Figure 3:
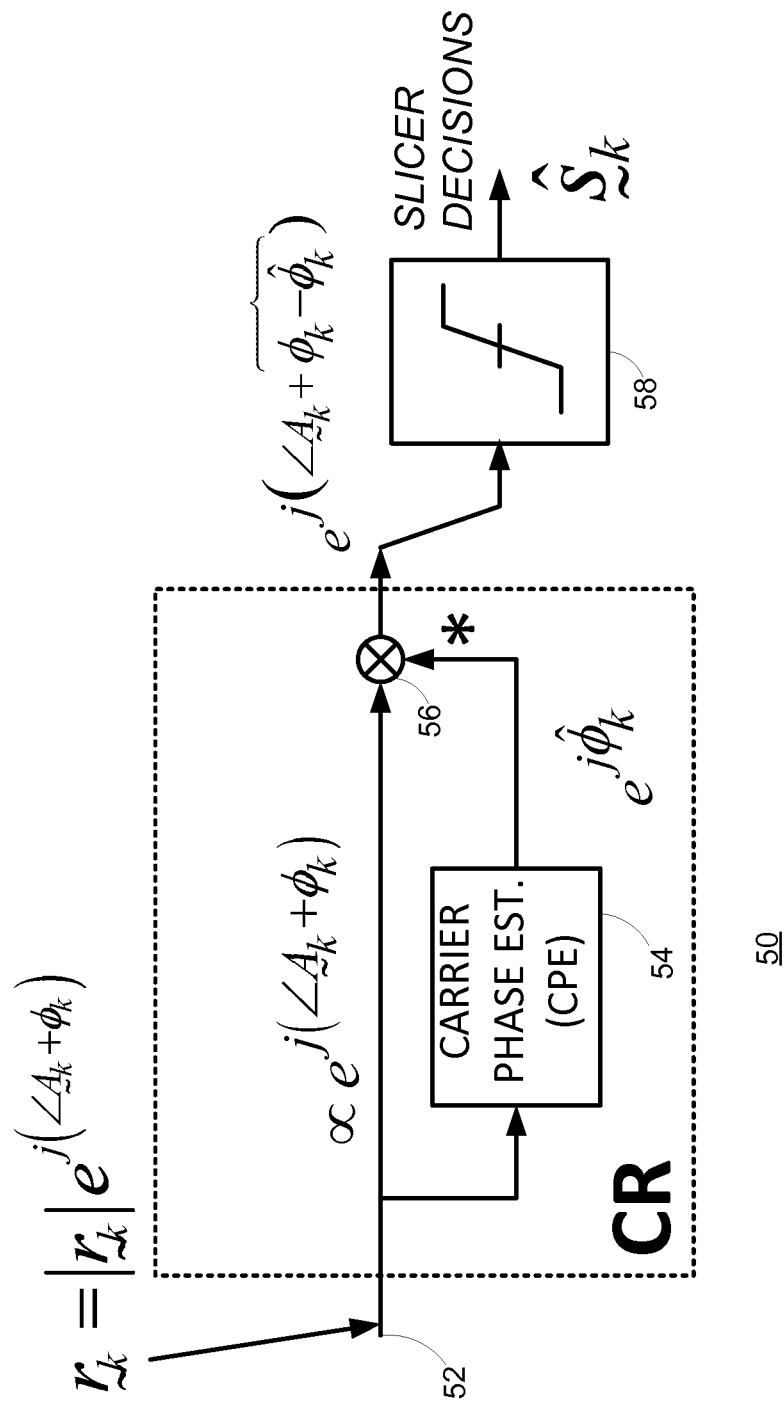
FIG. 3 illustrates a carrier recovery according to an embodiment of the invention.

FIG. 3. Illustrates a carrier recovery module that illustrates an input signal 53 that enters a multiplier 56 and a carrier phase estimator CPE 54, the complex conjugate of the output signal of CPE 54 is also provided to the multiplier 56. The multiplier is followed by a slicer 58.

2.3 Naïve Delay Detector

A simple CPE strategy is to use delay-detection (DD). The simple CR $$\hat{s}_k = r_k r_{k-1}^*$$

is variously referred to as delay detector, differential detector or delay demodulator (all abbreviated as DD). The received signal $r_k = |r_k| e^{j(\angle A_k + \phi_k)}$ is then conjugate-multiplied with a unit-time delayed version of itself, $$r_{k-1} = |r_{k-1}| e^{j(\angle A_{k-1} + \phi_{k-1})},$$

yielding $$\hat{s}_k = r_k r_{k-1}^* \quad (8)$$

$$= |r_k||r_{k-1}| e^{j(\angle A_k - \angle A_{k-1} + \phi_k - \phi_{k-1})}$$

$$= |r_k||r_{k-1}| e^{j(\angle s_k + \phi_k - \phi_{k-1})}$$

where the differential precoding relation (1) was used in the last equality. The rounded hat on the CR output indicates that this is an "analog" estimate of the transmission symbol $s_k$, attempting to approximate at least the phase $\angle s_k = \angle A_k - \angle A_{k-1}$ of as faithfully as possible. This noisy estimate, $\hat{s}_k$ is then sliced (its phase is quantized) in order to extract the decision (pointed hat denotes decision, rounded hat denotes the CR output—noisy estimate of to be input into the slicer). As is well known, the naïve DD is too noisy (approximately doubles the input ASE noise power) thus fails to provide a useful CR for coherent detection. Nevertheless the delay-detection concept is the starting point leading to the high-performance MSDD CR realization, which is interpreted as a generalization of the naïve DD.

Figure 4A:
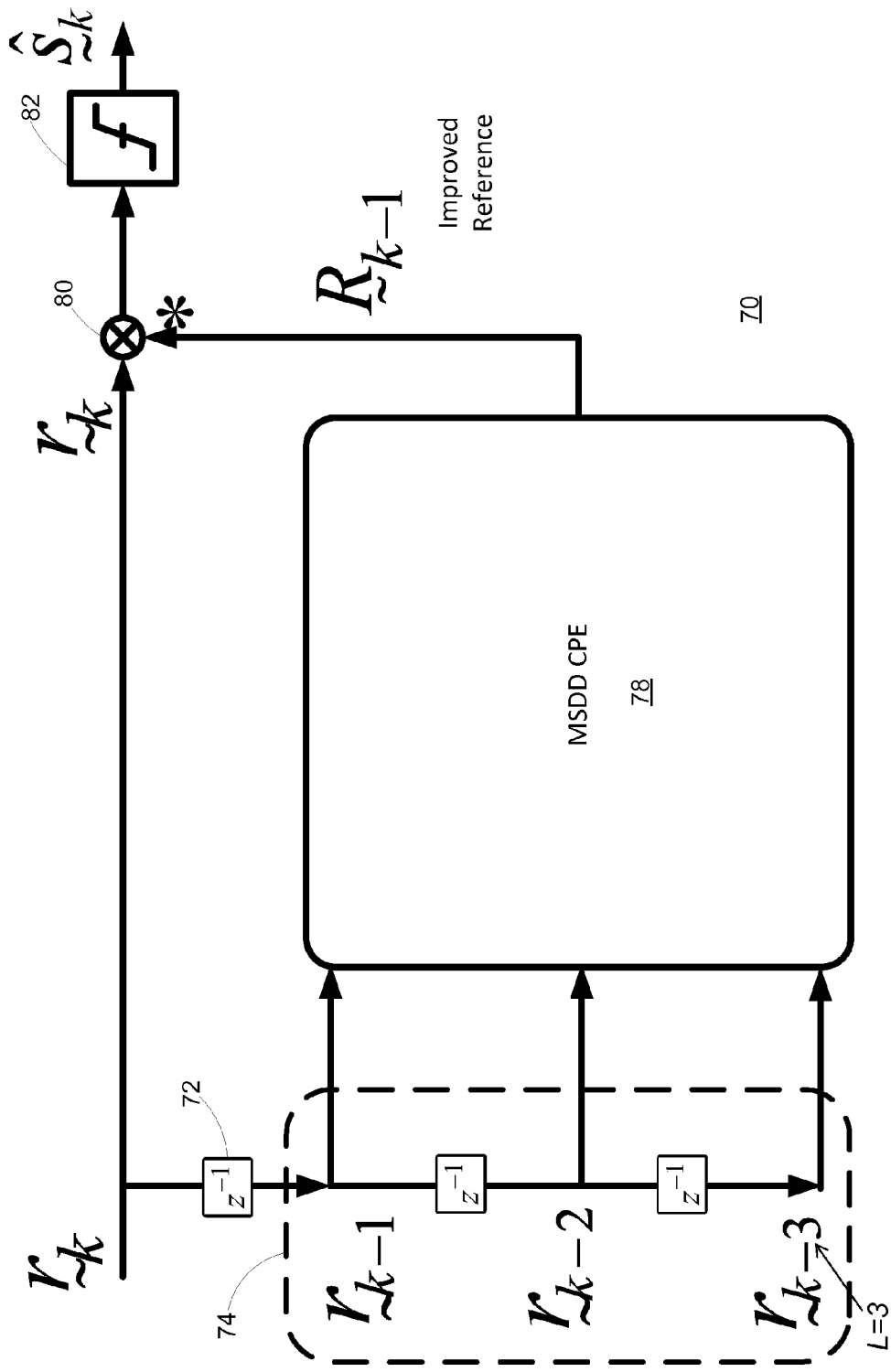
FIGS. 4A and 4B illustrate a receiver according to an embodiment of the invention.

FIG. 4A illustrates a MSDD CR system 70 operating on a window of L (for example—3) past samples in order to generate an improved reference for demodulation. FIG. 4A illustrates a MSCC CPE 78 that is fed by delayed versions of a receiver input signal (delayed by using delay unit 72 as well as delay units of delay module 74). The receiver input signal and a the complex conjugate of the output signal of MSDD CPE 78 are fed to multiplier 80 that is followed by slicer 82.

Figure 4B:
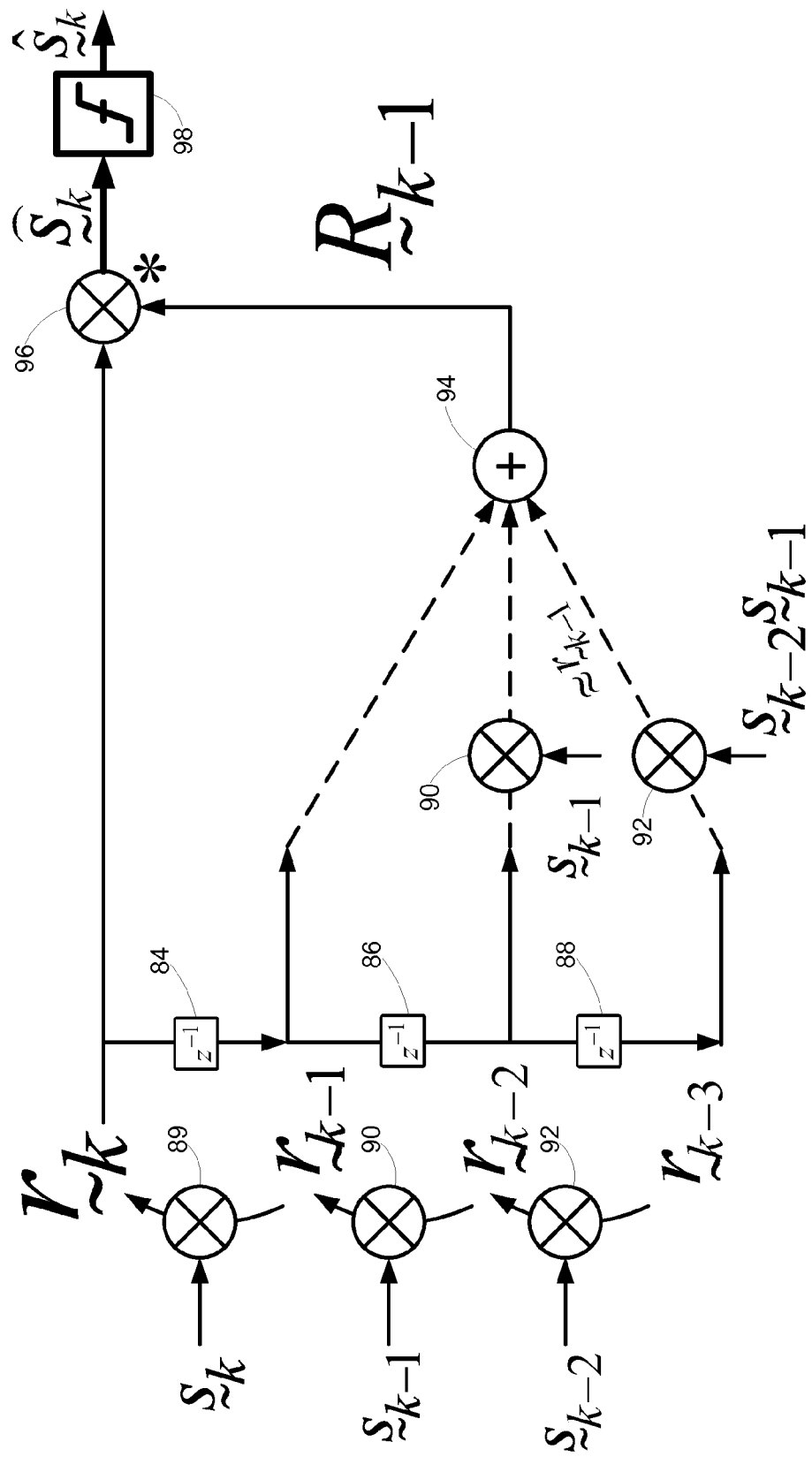

FIG. 4B illustrates a MSDD CPE that is realized by acting on each past sample at a time, rotating the respective past sample in order to bring it in approximate alignment with the last sample (the conventional DD reference). A sequence of delay units (includes delay units 84, 86 and 88) delays an input signal. The delayed signal from delay unit 86 is fed to delay unit 88 but is also fed to rotator 90 to be rotated and provided to adder 94. The delayed signal from delay unit 88 is fed to rotator 92 that rotates it and provided it to adder 94.

The output signal of delay unit 84 is also sent to adder 94. The receiver input signal and a the complex conjugate of the output signal adder 94 are fed to multiplier 96 that is followed by slicer 98.

Figure 5:
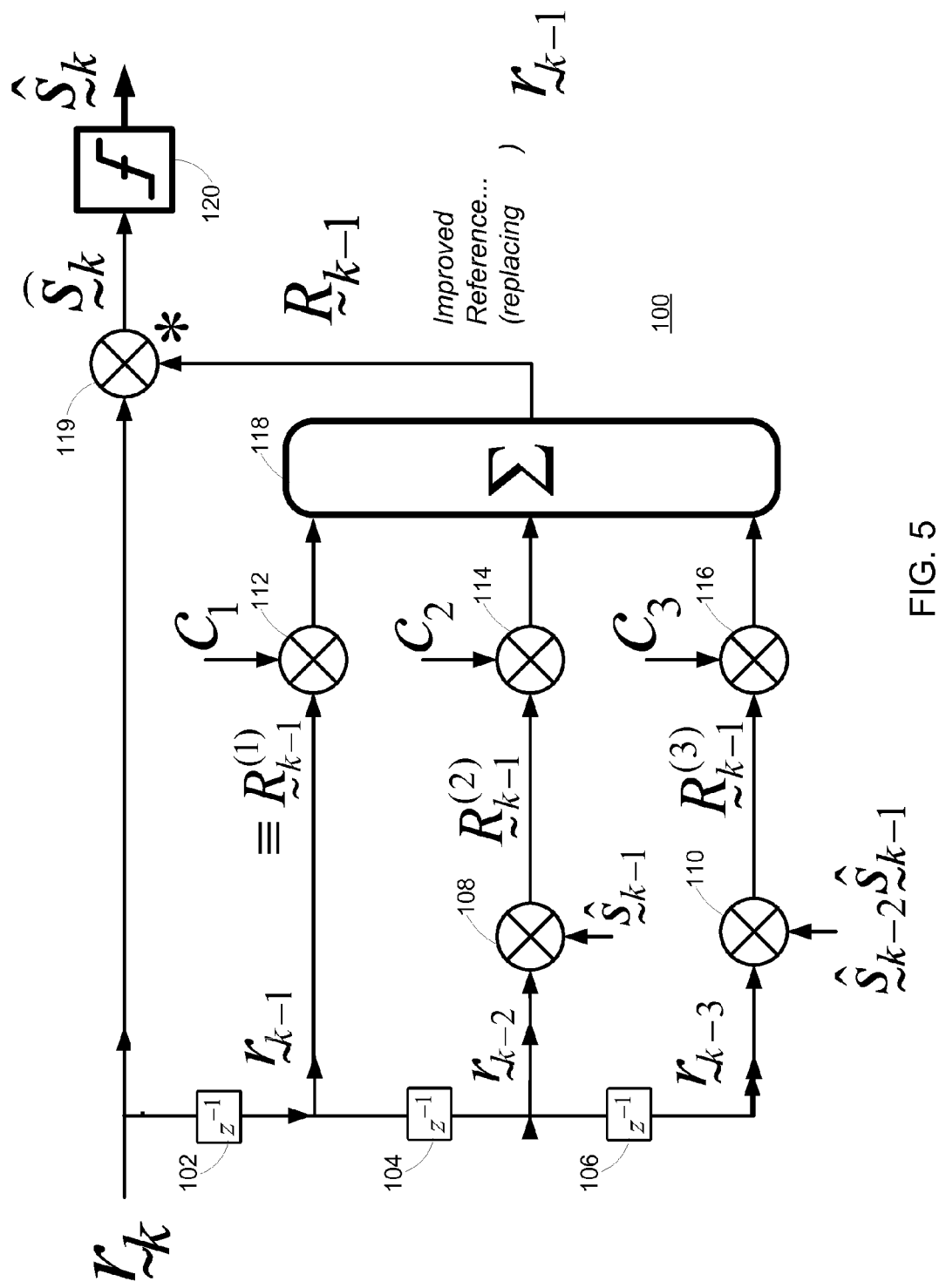
FIG. 5 illustrates a receiver according to an embodiment of the invention.

Either of these rotated-into-alignment past samples may be selected to serve as a "partial" reference. The improved reference will be obtained by taking a linear combination of all of the partial reference (FIG. 5). The multipliers vertically arrayed on the left indicate that, for each past noisy sample, rotating the sample before it by a corresponding transmission symbol yields a result approximately aligned with the respective past sample.

FIG. 5 illustrates an adder 118 and a sequence of delay units 102, 104, 104 and various rotators 108, 112, 110 and 114. Rotators 108 and 112 are connected in sequence between the output of delay unit 104 and an input of adder 118. Rotators 110 and 114 are connected in sequence between the output of delay unit 106 and another input of adder 118. Rotator 112 is connected between the output of delay unit 102 and a further input of adder 118.

The receiver input signal and a the complex conjugate of the output signal of adder 118 are fed to multiplier 119 that is followed by slicer 120.

3. From the Naïve DD to MSDD Carrier Recovery 3.1 MSDD Principle: Generation of an Improved Reference from Prior Received Samples In a naive DD, the last sample, $r_{k-1}$, is just too noisy a phase reference. Let us then also process the earlier samples, i.e. generate our CPE by acting on moving window of L past samples, $r_{k-1}, r_{k-2}, r_{k-3}, \ldots, r_{k-L}$, in order to form an improved reference, $R_{k-1}$, and demodulate the received samples with it, forming an improved decision variable to be presented to the slicer (FIG. 4a). Hopefully, the improved reference, $R_{k-1}$, will be quieter than the original reference, $r_{k-1}$. The problem we are facing in processing the earlier samples in order to form $R_{k-1}$, is that the prior samples $r_{k-i}$ are not aligned with $r_{k-1}$ due to the data modulation, thus if we attempt to use the $r_{k-i}$ terms instead of $r_{k-1}$ in the delay demodulation, then the demodulation will not function properly, unless we first rotate each of the terms in order to make then aligned with $r_{k-1}$. In FIG. 4b we show how this alignment process is applied one prior sample at a time. We already know we can accomplish proper (albeit noisy) delay detection with $r_{k-1}$ as phase reference. Next, let us consider $r_{k-2}$ as potential phase reference. The key is to revisit the DP recursion (1) for the transmitted line symbols. A similar recursion approximately holds between the received symbols, $r_k \cong s_k r_{k-1}$, as according to (5), the $r_k$-s are just noisy versions of $A_k$. Shifting the approximate recursion $r_k \cong s_k r_{k-1}$ back one time-unit (substituting k→k-1) yields $r_{k-1} \cong s_{k-1} r_{k-2}$, indicating that if $r_{k-2}$ is rotated by the complex information symbol $s_k$, we then obtain a rotated symbol, which is roughly aligned with the DD reference, $r_{k-1}$. Similarly, (taking yet another time-unit back) $r_{k-2} \cong s_{k-2} r_{k-3}$, thus compounding the last two equations yields the relation $r_{k-1} \cong s_{k-1} r_{k-2} = s_{k-1} s_{k-2} r_{k-3}$, which indicates that $R_{k-1}^{(3)} \equiv s_{k-1} s_{k-2} r_{k-3}$ may also be alternatively used as phase reference, as it is also nearly aligned with $r_{k-1}$. More generally, $$i = 1, 2, \ldots, \tag{9}$$

may be used as alternative phase references (for i=1 we simply retrieve the original reference $R_{k-1}^{(1)} \equiv r_{k-1}$). Each of these references are nearly aligned with $r_{k-1}$ and may be used instead of the originally considered $R_{k-1}^{(1)} \equiv r_{k-1}$ reference in order to delay-demodulate the received symbol $r_k$. Demodulation with yields the "partial estimates"

$$\tilde{s}_k^{(i)} \equiv r_k R_{k-1}^{(i)*}$$

each of which may be sliced in order to extract the k-th decision, $\hat{s}_k$.

At this point let us clarify the usage of decision feedback (DF). The partial reference (9) presumes that the transmission symbols are known at the Rx, which is evidently not the case (as then we would just use them for decisions, setting $\hat{s}_k = s_k$). In the absence of a "genie" whispering to us what the transmitted symbols are, the next best approximation is to use the slicer decisions $\hat{s}_k$ as estimates of the true $s_k$. Thus, in an actual implementation, we replace the partial reference (9), by a decision-feedback derived one (just placing hats over the s-es), $$R_{k-1}^{(i)} = \hat{s}_{k-1} \hat{s}_{k-2} \cdots \hat{s}_{k-i+1} r_{k-i} \quad i = 1, 2, \ldots, \tag{10}$$

As long as there is no decision error, then this is perfect, however decision errors, i.e. events $\hat{s}_k \neq s_k$ will generate erroneous rotation of the past symbols, such that some of the partial references will be incorrectly aligned. A theoretical analysis of the DF error propagation is outside the scope of the paper, but our numerical simulations invariably indicate that the impact of the error propagation is small Our simulations in section 8 fully account for the error propagation effect.

Which of the alternative phase references $R_{k-1}^{(i)}$, i=2, 3, . . . should be used for demodulation? It turns out that no particular one is preferred; however, the question arises whether we can take advantage of them all, combining these partial references into an improved reference generating a higher quality decision. In the case ASE-induced PN is a significant component of the overall PN (which usually holds when coherent-grade lasers are used), as white ASE noise is dominant, the partial references are essentially mutually independent. In this case it is advantageous to form a linear combination of these partial references (in the simplest case take their sum), generating an improved reference, as follows:

$$R_{k-1} = \underbrace{c_1 r_{k-1}}_{R_{k-1}^{(1)}} + \underbrace{c_2 \hat{s}_{k-1} r_{k-2}}_{R_{k-1}^{(2)}} + \underbrace{c_3 \hat{s}_{k-1} \hat{s}_{k-2} r_{k-3}}_{R_{k-1}^{(3)}} + \underbrace{c_4 \hat{s}_{k-1} \hat{s}_{k-2} \hat{s}_{k-3} r_{k-4}}_{R_{k-1}^{(4)}} + \ldots \tag{11}$$

This improved reference is used demodulate the received samples, generating an improved decision variable $$\widehat{s}_k = r_k \underline{R}_{k-1}^*$$

which is then input into the slicer. The resulting CR system, as illustrated in FIG. 5a, is the MSDD.

The improved reference $\underline{R}_{k-1}$ (11) is seen to be formed as a linear combination of L partial references, namely prior samples, phase rotated into alignment. A phasor diagram presenting the rotation (alignment) process of the various past samples is shown in FIG. 5b. In this figure for simplicity, all linear combination coefficients are taken equal, such that the linear combination forming the improved reference reduces to a sum of prior rotated samples. If there were no noise, the prior samples $\underline{r}_{k-2}, \underline{r}_{k-3}, \ldots, \underline{r}_{k-L}$ would become perfectly aligned with $\underline{r}_{k-1}$. If the PN is entirely white (ASE-induced, i.e. no LPN, i.e., (5) reduces to $\underline{r}_k = \underline{A}_k + \underline{n}_k$), then these noisy phasors are no longer perfectly aligned, yet are nearly collinear with $\underline{r}_{k-1}$ (which is itself perturbed by additive noise). Nevertheless, the additive white noise perturbations, $\underline{n}_k$, added to the noiseless symbols $A_{k-1}, A_{k-2}, A_{k-3}, \ldots, A_{k-L}$, to form the prior samples $\underline{r}_{k-1}, \underline{r}_{k-2}, \underline{r}_{k-3}, \ldots, \underline{r}_{k-L}$, are mutually uncorrelated, thus add up incoherently; in amplitude, the noises add up on an RMS basis, such that the total RMS noise grows as $\sqrt{L}$ as the window size of past samples, L, is increased. In contrast, the noiseless components $A_{k-1}, A_{k-2}, A_{k-3}, \ldots, A_{k-L}$ of the received samples, are all collinear and have equal lengths, thus the total signal component of the improved reference grows up linearly in L, therefore the SNR of improved reference grows up as $(L/\sqrt{L})^2 = L$.

It appears advantageous to accrue the noise averaging effect over arbitrarily long windows (though in practice, we would get diminishing returns beyond a certain window size, and the computational complexity must also be taken into account). However, when LPN is present, an opposite effect is at work, namely the longer the record of past samples used in forming the improved reference, the worse the LPN induced degradation. Thus, a "block length" effect emerges—it does not pay to increase the block length L indefinitely, but there is an optimal block length, L, as determined by the balance of the ASE and laser phase noises. In this simplified analysis we assumed equal coefficients, $c_i$ (taken as unity without loss of generality), but more generally the linear combination coefficients may be arbitrarily selected, in the combined presence of ASE and LPN phase noise sources. In section 4 we apply Wiener filtering theory in order to determine unequal optimal coefficients $\hat{c}_i$ which yield the best performance for any given block length L, striking the best balance between the opposing effects of ASE and LPN.

3.2 MSDD Alternative Formulation in Terms of Partial DD Estimators

To derive an alternative point of view of the MSDD demodulation process, let us substitute the improved reference (11) into the demodulation relation, $$\widehat{s}_k = r_k \underline{R}_{k-1}^*,$$

yielding $$\widehat{s}_k = r_k \left[ \sum_{i=1}^{L} c_i \underline{R}_{k-1}^{(i)} \right]^* \quad (12)$$

$$= \sum_{i=1}^{L} c_i r_k \underline{R}_{k-1}^{(i)*}$$

$$= \sum_{i=1}^{L} c_i \widehat{s}_k^{(i)}$$

where we used (9) for the i-th partial reference and introduced the i-th partial estimator $$\widehat{s}_k^{(i)} = r_k \underline{R}_{k-1}^{(i)*} \quad (13)$$

$$= [s_{k-1} s_{k-2} \cdots s_{k-i+1}]^* r_k r_{k-i}^*$$

It is apparent in (12) that the MSDD estimate of the transmitted symbol may be expressed as a linear combination of partial estimators $\widehat{s}_k^{(i)}$, each obtained by demodulation with a partial reference, each of which could by itself provide a valid, albeit noisier, estimate for the information symbol, as described in the block diagram of FIG. 5a. It turns out that this alternative equivalent realization of the MSDD would be less desirable for efficient computation than the original MSDD block diagram of FIG. 5, which generates first the improved reference, (11), as a linear combination of partial references, then demodulates with it. Nevertheless the alternative partial-estimators formulation (12) is more amenable to Wiener optimization, as pursued next.

4. Optimal Wiener-Filtering Based Minimum Mean Square Error (MMSE) Solution

In this section we derive the MMSE optimal solution, which aims at minimizing the Mean Square Error (MSE) between the QPSK or QAM symbols, $s_k$ and their estimates $\widehat{s}_k$, as generated at the MSDD output (slicer input). Introducing the estimation error, we seek the optimal MSDD coefficients minimizing the MSE, $\langle |\epsilon_k|^2 \rangle = \langle |s_k - \widecheck{s}_k|^2 \rangle$.

Note that, for the purpose of QPSK detection, we have heretofore ignored the magnitude (modulus) of the improved estimate $\widehat{s}_k = r_k \underline{R}_{k-1}^*$, which is generated by mixing the received symbol $r_k$ with the improved reference $$\underline{R}_{k-1} = \sum_{i=1}^{L} c_i \underline{R}_{k-1}^{(i)},$$

in the process of the generation of which the magnitudes were not normalized. As the QPSK slicer essentially acts on the angle of $\widehat{s}_k$, ignoring the magnitude $|\widehat{s}_k|$ does not pose a problem. A different length of the reference phasor will just scale the modulus of estimate without affecting its phase. However, once QPSK transmission is extended to QAM, the references magnitudes do become important. Even in the current QPSK context, proper processing of references magnitudes does become essential in the MMSE formulation and derivation. Indeed, although the phase of our slicer input generated by the MSDD tends to be close to that of the actual transmission symbol, $s_k$, nevertheless if the magnitudes of $\widehat{\widetilde{s}}_k$ and $s_k$ are disparate, then a large MSE deviation may still be generated, defeating the minimization process. Thus, in order to properly optimize the MSDD coefficients, it is imperative to properly scale magnitudes, such that the estimate be made to approach $s_k$ not only in phase but also in modulus, and a small residual estimation error may be generated. Here we use the Uop normalization (2) as a key step enabling to devise a modified MSDD structure for QPSK (also applicable to QAM), suitable for attaining the MMSE condition. To this end, we propose to apply the Uop to the partial references, $\widetilde{R}_{k-1}^{(i)}$, now to be replaced by Uop-normalized versions $\check{R}_{k-1}^{(i)}$ (which preserve the original angles of $\widetilde{R}_{k-1}^{(i)}$, i.e., are still nearly aligned with $r_{k-1}$, hence are also suitable to form an improved reference):

$$\check{R}_{k-1}^{(i)} = U\{r_{k-i} \widehat{\widetilde{s}}_{k\ k-i+1} \widehat{\widetilde{s}}_{k\ k-i+2} \ldots \widehat{\widetilde{s}}_{k\ k-1}\} = \check{r}_{k-i}$$

$$\widehat{\widetilde{s}}_{k\ k-i+1} \widehat{\widetilde{s}}_{k\ k-i+2} \ldots \widehat{\widetilde{s}}_{k\ k-1} \quad (14)$$

The resulting MSDD improved reference is then formed by the linear combination $$\underset{\sim}{R}_{k-1} = \sum_{i=1}^{L} c_i \check{R}_{k-1}^{(i)} \quad (15)$$

Here, the inverted under-hat at the bottom of $\underset{\sim}{R}_{k-1}$, through resembling the inverted over-hat used to denote the Uop, does not actually indicate, that $\underset{\sim}{R}_{k-1}$ is a normalized unimodular quantity, but it rather signifies here that it is formed as a linear combination of quantities which are themselves unimodular. Notice that a linear combination of Uop-normalized quantifies is generally not unimodularly normalized itself (unimodularity is not preserved under a linear combination). In fact, whether or not is unimodular depends on the c-coefficients selection, which for the MMSE solution pursued below, will assume optimal values which make $\underset{\sim}{R}_{k-1}$ nearly unimodular (notice that $$|\underset{\sim}{R}_{k-1}| \cong 1$$

if $$\sum_{i=1}^{L} c_i \cong 1).$$

This modified version of the MSDD will be referred to as "U-notU", as the partial references are Uop normalized, whereas the improved reference $\underset{\sim}{R}_{k-1}$ is not necessarily Uop normalized.

Using the U-notU magnitude normalizations proposed here, the modified "U-notU" MSDD is analyzed in Appendix B in terms of the phase-noisy memoriless channel model.

The overall improved estimate (12) is a linear combination of the partial estimates. It is then useful to explicitly express dependency of the partial estimates on the phase noise (7):

$$\widetilde{s}_k^{(i)} \equiv r_k \widetilde{R}_{k-1}^{(i)*} = \quad (16)$$

$$rU\{\widetilde{R}_{k-1}^{(i)*}\} = r_k U\{r_{k-i} \widecheck{s}_{k-i+1} \widecheck{s}_{k-i+2} \ldots \widecheck{s}_{k-1}\}^* = r_k \widetilde{r}_{k-i}^* \widetilde{s}_{k-i+1}^*$$

$$\widetilde{s}_{k-i+2}^* \ldots \widetilde{s}_{k-1}^* = \left(A_k p_k\right)\left(A_{k-i} \overline{p}_{k-i}\right) \widetilde{s}_{k-i+1}^* \widetilde{s}_{k-i+2}^* \ldots \widetilde{s}_{k-1}^* =$$

$$A_k \overline{A}_{k-i} \widetilde{s}_{k-i+1}^* \widetilde{s}_{k-i+2}^* \ldots \widetilde{s}_{k-1}^* p_k \overline{p}_{k-i} = s_k \cdot p_k \overline{p}_{k-i}$$

where in the last expression we used the generalized delay-detection relation (34) derived in Appendix A, namely $$s_k = A_k \breve{A}_{k-i} * \breve{s}_{k-i+1} * \breve{s}_{k-i+2}^* \ldots \breve{s}_{k-1}^*.$$

The resulting Eq. (16) indicates that indeed qualify as partial estimators for $s_k$, as they essentially coincide with the transmitted symbols $s_k$, apart from multiplicative phase noise perturbations $p_k \breve{p}_{k-i}$.

Considering the U-notU modified MSDD structure, as introduced above, we now address the problem of optimizing the c-coefficients such as to minimize the Mean Square Error (MSE) between the transmitted symbol, $\hat{s}_k$, and its MSDD estimate $\widehat{\widetilde{s}}_k$. First, we compactly express the MSDD estimate in terms of inner products between a coefficients vector and vectors of partial estimates and partial references (here denotes the conjugate transpose, while the overbar is an alternative notation for the complex conjugate):

$$\hat{s}_k = \sum_{i=1}^{L} \overline{c}_i r_k \breve{R}_{k-1}^{(i)*} \quad (17)$$

$$= \sum_{i=1}^{L} \overline{c}_i \hat{s}_k^{(i)}$$

$$= \overline{c}^T \hat{s}_k$$

$$= c^\dagger \hat{s}_k$$

$$\hat{s}_k \equiv [\hat{s}_k^{(1)}, \hat{s}_k^{(2)}, \ldots, \hat{s}_k^{(L)}]^T$$

$$= \left[r_k \breve{R}_{k-1}^{(1)*}, r_k \breve{R}_{k-1}^{(2)*}, \ldots r_k \breve{R}_{k-1}^{(L)*}\right]^T$$

$$= r_k \breve{R}_{k-1}^*;$$

$$\breve{R}_{k-1} \equiv \left[\breve{R}_{k-1}^{(1)}, \breve{R}_{k-1}^{(2)}, \ldots, \breve{R}_k^{(L)}\right]^T;$$

$$c \equiv [c_1, c_2, \ldots, c_L]^T$$

The estimation error is then expressed as, and the MSE is written as:

$$\left\langle |\varepsilon_k|^2 \right\rangle = \left\langle |s_k - \widehat{\widetilde{s}}_k|^2 \right\rangle = \left\langle |s_k - c^\dagger \widehat{\widetilde{s}}_k|^2 \right\rangle$$

We seek the optimal coefficients vector minimizing the MSE. Even prior to deriving the rigorous MMSE solution on approx. magnitude preservation condition:

$$|\hat{s}_k| = |r_k \underset{\sim}{R}_{k-1}^*| = |r_k||\underset{\sim}{R}_{k-1}| \cong |r_k| \text{ if } \sum_{i=1}^{L} \overline{c}_i \cong 1.$$

e can infer an approximate constraint on the coefficients: The Wiener formulation is standard, leading to the Wiener-Hopf (W-H) equations for the optimal coefficients c:

$$\Gamma_{\hat{s}_k} c = \Gamma_{\hat{s}_k, s_k} \Leftrightarrow \sum_{j=1}^{L} \Phi_{ij} c_j = v_i, \quad (19)$$
$$i = 1, 2, \ldots, L$$

where $\Gamma_{AB} = \langle AB^\dagger \rangle$ generically denotes the correlation matrix of two column vectors (in particular or B might be scalar), the autocorrelation matrix is denoted, and the components of the correlation matrices are defined as $$v_i \equiv \left[\Gamma_{\hat{s}_k, s_k}\right]_i; \Phi_{ij} \equiv \left[\Gamma_{\hat{s}}\right]_{ij} \quad (20)$$

Most of Appendix B is devoted to evaluating the joint second order statistics (20) for our optical channel (5), resulting in expressions (48) which are substituted into (19), reducing to the following operational form of the W-H linear system of equations in the L unknowns $c_j$:

$$\sum_{j=1}^{L} \left(1 + \langle SNR_k^{Tx}\rangle^{-1}(1 + \delta_{i-j})\right) e^{-\pi\Delta \hat{v}|i-j|} c_j = e^{-\pi\Delta \hat{v} i}, \quad (21)$$
$$i = 1, 2, \ldots, L$$

where we defined the time-dependent transmission SNR, with the expectation taken over all constellation points. Thus, the inverse expected SNR parameter featuring in (21) is given by:

$$\langle SNR_k^{Tx}\rangle^{-1} = \sigma_n^2 / \langle |s_k|^2\rangle = \sigma_n^2 \frac{1}{m} \sum_{\alpha=1}^{m} |s_k^{(\alpha)}|^2 \quad (22)$$

This derivation is generally applicable to QAM, though our interest in this paper is in QPSK. Our final form (21) of the W-H equations for the U-notU optimal coefficients $c_j$ may be solved numerically offline, provided that the statistical/physical parameters (signal power, ASE noise variance and laser linewidth) have been estimated. A more practical approach pursued next is to derive an LMS adaptation scheme for the coefficients, such that the coefficients are iteratively adjusted, approximately converging to the optimal MMSE values mandated by the W-H equation, automatically learning the phase-noise channel statistics.

5. LMS Algorithm for the MSDD Coefficients

In practice, the channel phase-noise statistics (balance of laser phase noise, ASE, and also nonlinear phase noise contributions) is unknown and may even be time-varying. Therefore, it is advantageous to devise an adaptive method to approach the optimal MSDD coefficients automatically. Here we derive an LMS algorithm for the "U-notU" MSDD coefficients.

Conjugate-transposing the orthogonality relation (37), yields $$\langle \epsilon_k \hat{S}_k^\dagger \rangle = 0 \Leftrightarrow \langle \epsilon_k^* \hat{S}_k \rangle =$$
$$\langle (s_k^* - c^T \hat{S}_k^*) \hat{S}_k \rangle = 0 \quad (23)$$

Let us introduce the updates vector and substitute $\hat{S}_k = r_k \bar{R}_{k-1}^*$:

$$U[k] \equiv \epsilon_k^* \hat{s}_k \quad (24)$$
$$= \epsilon_k^* r_k \bar{R}_{k-1}^*;$$
$$U_i[k] \equiv \epsilon_k^* \hat{s}_k^{(i)}$$
$$= \epsilon_k^* r_k \bar{R}_{k-1}^{(i)*}$$
$$= \epsilon_k^* r_k \bar{r}_{k-i} \check{s}_{k-i+1} \check{s}_{k-i+2} \cdots \check{s}_{k-1}$$

where the last expression in (24) was obtained substituting (14). In light of (23), the updates vector has zero expectation, $\langle U[k]\rangle = \langle \epsilon_k^* \hat{S}_k \rangle = 0$, whenever the coefficients are MMSE optimal. The elements of the update vector provide the coefficient updates for the LMS algorithm associated with the MMSE problem. When its expectation is not zero, the update vector tells us in which direction to adjust the coefficients in order to advance to zero expectation, i.e. to optimal coefficients. To verify that the proper coefficients update vector for the LMS algorithm is indeed given by (24), we evaluate the squared error (SE) gradient, $$|\epsilon_k|^2 = \epsilon_k \bar{\epsilon}_k = (s_k - \bar{c}^T \hat{S}_k)(s_k^* - c^T \hat{S}_k^*) \quad (25)$$

(i.e., without taking the expectation). Using the Wirtinger complex-conjugate derivative technique as described in [33], the SE gradient $\nabla_c \equiv [\partial_{c1}, \partial_{c2}, \ldots, \partial_{cL}]^T$ with respect to the coefficient vector is derived as follows:

$$\nabla_c |\epsilon_k|^2 = \epsilon_k \bar{\epsilon}_k \quad (26)$$
$$= 2\nabla_{\bar{c}}^\partial \{(s_k - \bar{c}^T \hat{s}_k)(s_k^* - c^T \hat{s}_k^*)\}$$
$$= 2(s_k^* - c^T \hat{s}_k^*)\nabla_{\bar{c}}^\partial (s_k - \bar{c}^T \hat{s}_k)$$
$$= -2(s_k^* - c^T \hat{s}_k^*)\nabla_{\bar{c}}^\partial (\bar{c}^T \hat{s}_k)$$
$$= -2(s_k^* - c^T \hat{s}_k^*)\hat{s}_k$$
$$= -2\epsilon_k^* \hat{s}_k$$
$$= -2U[k]$$

Here $\nabla_{\bar{c}}^\partial$ indicates partial differentiation relative to the conjugate vector, with viewed as independent of $\bar{c}$. The LMS coefficients update then reads $$c[k+1] = c[k] - \frac{\mu}{2}\nabla_c|\epsilon_k|^2\big|_{c=c[k]} \quad (27)$$
$$\Leftrightarrow c[k+1] = c[k] + \mu U[k] \Leftrightarrow c_i[k+1] = c_i[k] + \mu U_i[k]$$

Substituting the coefficient update (24) yields our final result, the LMS coefficients recursion:

$$c_i[k+1] = c_i[k] + \mu \varepsilon_k^* \underline{r}_k \tilde{R}_{k-1}^{(i)*} \quad (28)$$

with $$\tilde{R}_{k-1}^{(i)*} = \tilde{r}_{k-i}\tilde{s}_{k-i+1}\tilde{s}_{k-i+2} \cdots \tilde{s}_{k-1},$$

while the error is expressed in terms of as per (15):

$$\varepsilon_k = s_k - \widehat{S}_k = s_k - \underline{r}_k \underline{\tilde{R}}_{k-1}^* \quad (29)$$

This leads to an adaptive U-notU version of the MSDD LMS CR, as implemented in FIGS. 6, 7 below, applicable to both QPSK and QAM, though our interest in this paper is in QPSK systems. The performance attainable with this LMS algorithm will be ascertained in section 8.

6. Efficient Hardware Implementations

Figure 6:
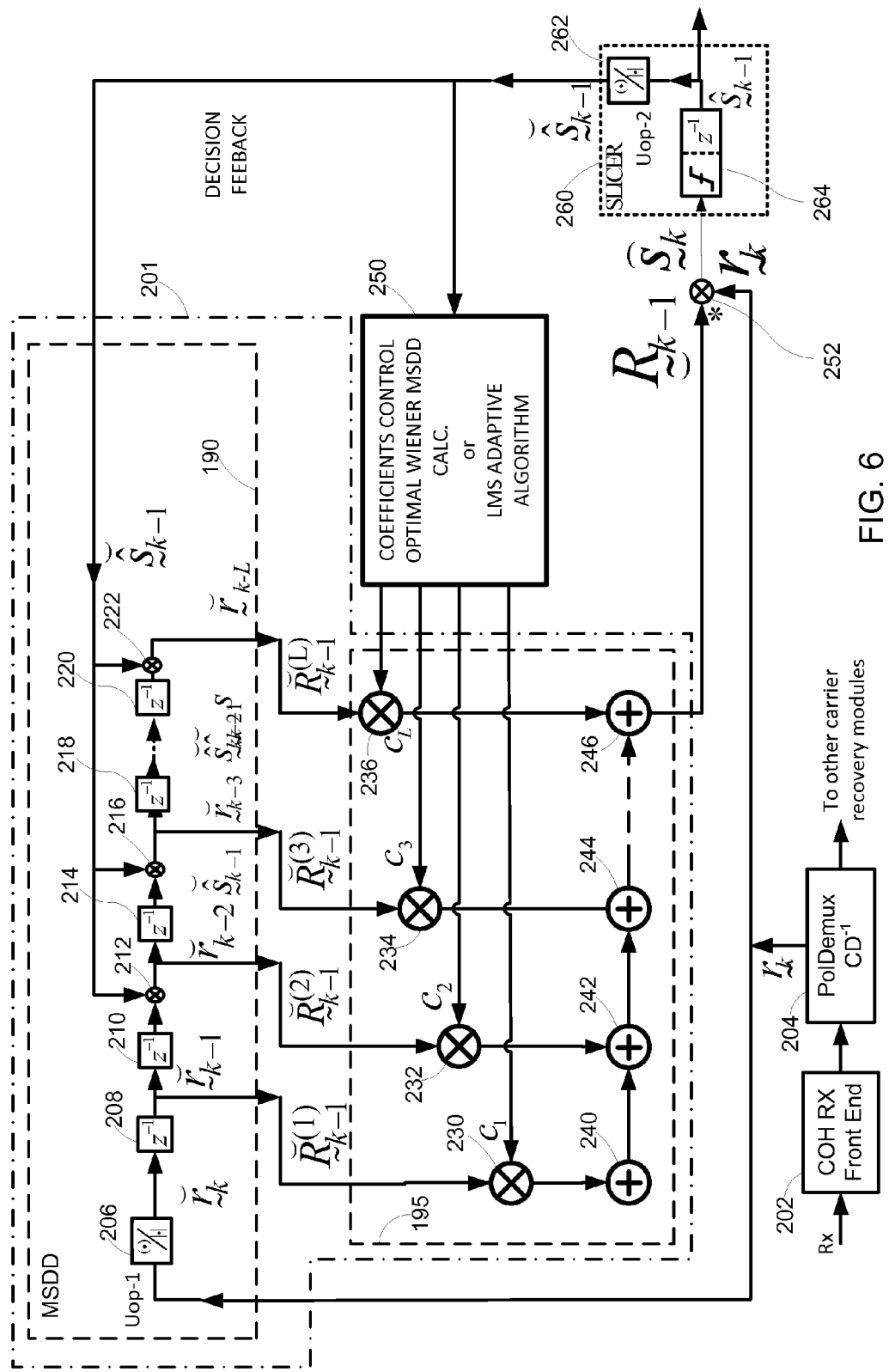
FIG. 6 illustrates a receiver according to an embodiment of the invention.

In this section we derive an efficient hardware implementation for the MSDD sub-system, as illustrated in FIG. 6 below. In this block diagram, the number of complex multiplications is reduced below the one implied by (11), which indicates that the MSDD must calculate, in every clock cycle, the linear combination (15) of partial references. The direct evaluation of the i-th partial reference, (9), $$\tilde{R}_{k-1}^{(i)} \equiv \tilde{s}_{k-i}\tilde{s}_{k-2} \cdots \tilde{s}_{k-i+1}\tilde{r}_{k-i},$$

seems to require i−1 multiplications by s-symbols to be applied to $\underline{r}_{k-i}$, per clock cycle. The diagram of FIG. 6 presents a more efficient realization, first disclosed in [30], wherein just a single complex multiplication of $\underline{r}_{k-i}$ with an s-symbol is performed per clock cycle, rather than i−1 complex multiplications. This complexity reduction is achieved by a skillful arrangement of multipliers interspersed with delay line at the top of the figure, used to generate the partial references.

In addition, we modify the block diagram of FIG. 6 to incorporate the Uop required in the modified MSDD structure introduced in the last section, enabling either the MMSE optimal solution derived in section 4 or the LMS based adaptive solution, as per section 5. Uops are also required for extending QPSK to QAM transmission, to be pursued in future publication, thus our QPSK MSDD structure is "QAM-ready".

The block diagram further features a coefficients control module tasked with generating the optimal coefficients, $c_i$, whether by an offline MMSE calculation (solution of the W-H equation as derived in the last section, or alternatively (preferably) by means of the adaptive LMS algorithm (28). In addition, in order to implement the U-notU MSDD modification, a Uop acting on the received samples, $\underline{r}_k$, is inserted ahead of the partial references delay line at the top of the figure.

6.1 MSDD Hardware Realization Complexity (Excluding the Adaptive Coefficients Control)

Inspecting FIG. 6, let us initially ignore the complexity of the coefficients control module. We then count, in the core MSDD system, L complex multipliers (CM) of the partial estimates with the $c_i$ coefficients, as well as L multipliers performing rotations by the QPSK decision symbols. As multiplications by the QPSK constellation points {±1, ±j} are trivial, those do not contribute complexity. In addition, we have an extra full-fledged CM for the demodulation, $\widehat{S}_k = \underline{r}_k \underline{R}_{k-1}^*$. We should also account for the Uop complexity, which was estimated in Appendix A to consist of four real-multipliers, amounting to CMs, expressing complexity in equivalent CM terms. Thus, overall there are complex multiplications to be performed per clock-cycle. We further note that the complexity of the L multiplications with the c, coefficients may be reduced by quantizing the coefficients to various degrees, setting a tradeoff between complexity and precision (i.e., CR performance).

FIG. 6 illustrates a receiver 200 that includes front end 202, polyphase demultiplexer 204 and a carrier recovery module 201 that includes a port 203 arranged to receive a receiver input signal that is representative of an optically coherent signal that was received by the receiver as a result of a transmission, by an optical transmitter, of a transmitter signal that is a carrier signal that is being modulated by information; a reference signal generator 180 that is arranged to generate a reference signal that estimates the carrier signal; a decision module 260 that is arranged to demodulate the receiver input signal by the reference signal to provide a demodulated signal and to evaluate the demodulated signal to provide an decision module output signal that estimates the carrier signal. The reference signal generator 201 may include a delay and rotation module 190 that is arranged to delay receiver input signals to provide delayed receiver input signals and to align the delayed receiver input signals by a rotation that is responsive to the decision module output signal thereby providing aligned signals; a multiplication and summation module 195 that is arranged to generate the reference signal by calculating a weighted sum of the aligned signals.

FIG. 6. QPSK receiver block diagram detailing the "U-not U" MSDD efficient hardware structure, with Wiener-optimal or adaptive coefficients (the adaptive coefficients control is detailed in the next figure). Notice the presence of two Uop modules, however the one within the slicer does not incur extra complexity, as it may be implemented as a look-up table. The delay line with multipliers at the top of the figure incurs negligible complexity, as multiplication with QPSK constellation elements are trivial.

FIG. 6 also illustrated a coefficient calculator 250, a decision module 260 that includes a slicer and a delay unit (both denoted 264) and a normalizing module 262. The normalizing module 262 is arranged to normalize a decision output signal to provide a normalized output signal signals that is used to rotate at least some of the delayed receiver input signals.

The delay and rotation module 190 includes a sequence of normalizing module 262, delay unit 208, delay unit 210, multiplier 212, delay unit 214, multiplier 216, delay unit 218, delay unit 220 and multiplier 222.

The multiplication and summation module 195 is illustrated as including multipliers 230, 232, 234 and 236 and adders 240, 242, 244 and 246. The output signal of adder 246 and a complex conjugate of the input receiver signal are fed to multiplier (Demodulator) 252 that has its output signal sent to decision module 260. The normalized decision module output signal is fed to multipliers 222, 216 and 212.

Figure 7:
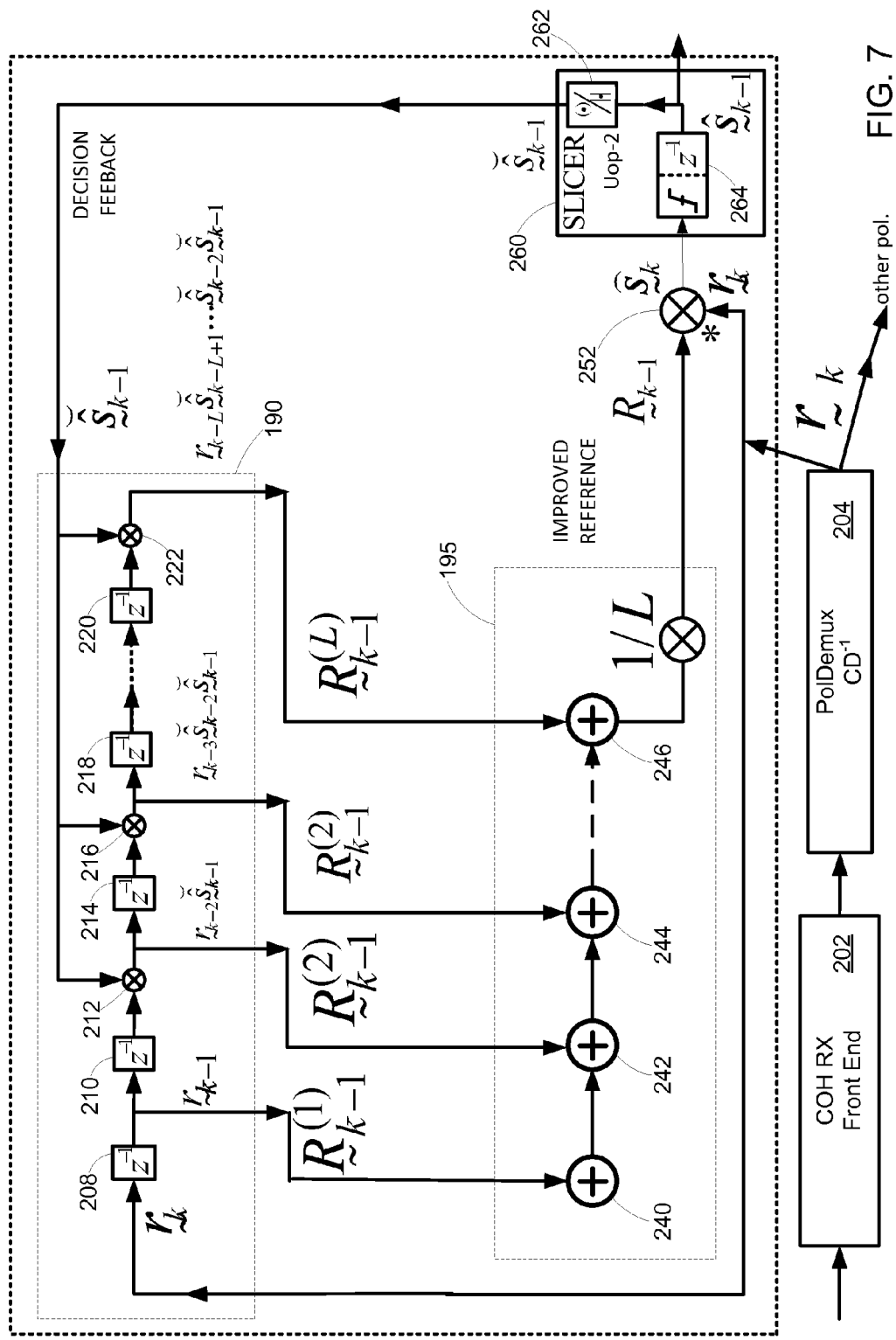
FIG. 7 illustrates a receiver according to an embodiment of the invention.

A simplified system is obtained for $c_i=1/L$, replacing the L coefficients multiplications by a single scaling multiplication performed prior to the demodulation, as indicated in FIG. 7. In this reduced-complexity MSDD version, as the coefficients are no longer optimized, the Uop may be discarded.

Thus, this highly efficient non-optimal QPSK MSDD version, with uniform coefficients, requires just a single heavy complex multiplication (the one used for the demodulation). Evidently, as non-optimal coefficients are used, there is some performance degradation. Nevertheless, if the laser linewidth does not exceed 0.5 MHz, the resulting performance penalty will be quite small or even negligible (see section 8). This reduced complexity MSDD implementation is preferred for 100 G QPSK low-cost applications.

The carrier recovery module of FIG. 7 differs from the carrier recover module of FIG. 6 by not including coefficient calculator 250, by not including a normalizing module 206 at the beginning of the rotation and summation module 190 and by having a slimmer multiplication and summation module 195 that includes a single multiplier 276 that follows adders 240, 242, 244 and 246.

6.2 MSDD with Adaptive Coefficients Control and its Total Complexity

Figure 8A:
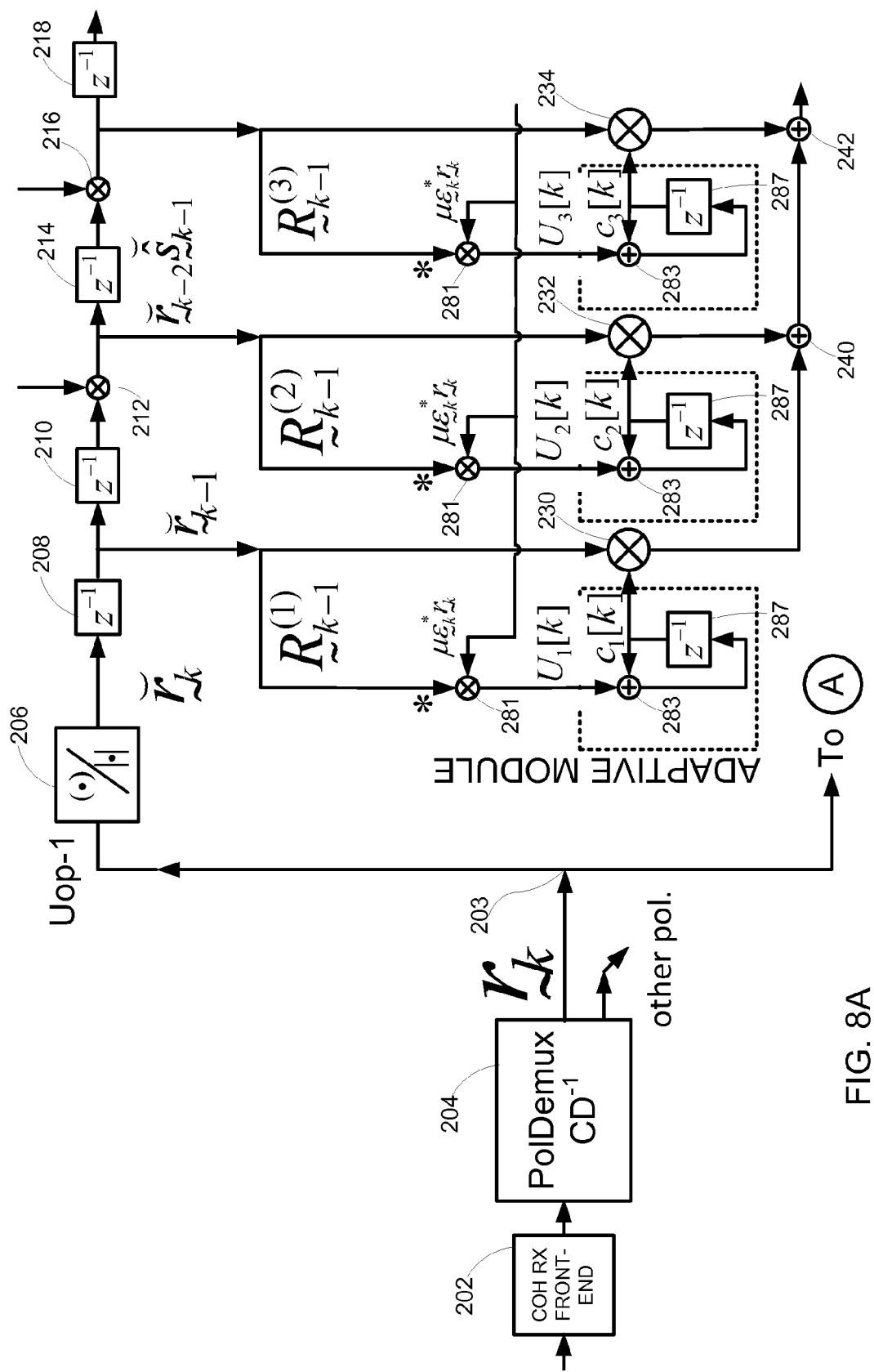
FIGS. 8A and 8B illustrate a receiver according to an embodiment of the invention.
Figure 8B:
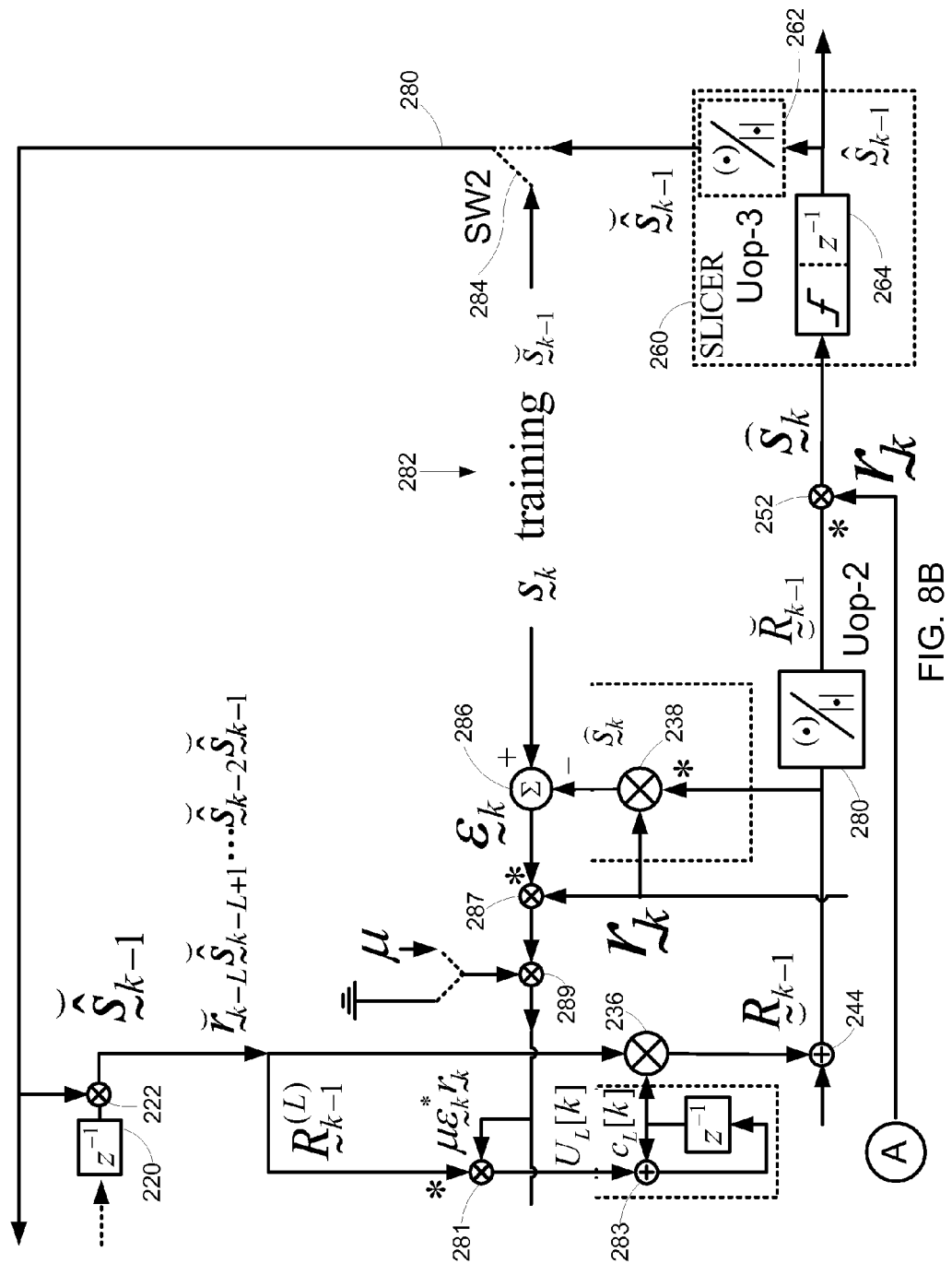

At the high-end extreme, consider a high performance system with its coefficients LMS-optimized, as described in FIG. 8, which details the inner workings of an adaptive realization of the "coefficients control" module of FIG. 6. This diagram precisely implements the functionality of the adaptive algorithm described in section 5.

FIG. 8. QPSK/QAM receiver with "U-notU" adaptive MSDD, including full detail on the coefficients adaptation mechanism. This scheme, intended here for QPSK, is "QAM-ready". For QPSK, the Uop-2 module may be discarded (and Uop-3 is always a trivial lookup-table) thus just Uop-1 is required to implement the QPSK U-notU version.

In FIG. 8 the coefficient calculator 250 of FIG. 6 is illustrated in greater details as including switch 284 to be used during training sequences of the coefficient module 250, to feed during a training period, training signals 282 to the coefficient calculator, The coefficient calculator 250 is illustrated as including normalizing module 290, adder 286, complex multiplier 238, multipliers 287, multiplier (by coefficient mue) 289, multipliers 281, multipliers 283 and delay units 287.

Accounting now for the contribution of the coefficients adaptation to complexity, we must consider additional CMs: Another full-fledged CM, $\epsilon_k^* r_k$, an easy CM generating fixed scaling by $\mu$ (which may be quantized to a convenient value, with few one-bits, which is simple to multiply by, so it will not be counted), then another full-fledged CM $r_k \tilde{R}_{k-1}$ required for generating the error, (29), plus L full-fledged CMs generating the coefficient updates, $$U_i[k] = \mu \epsilon_k^* r_k \tilde{R}_{k-1}^{(i)*}.$$

Thus L+2 extra full-fledged the adaptive part, which when added to the L+2⅓ non-adaptive multiplications, yields a total of full-fledged complex multiplications for the high-end adaptive CR realization of FIG. 8 for our high-end L-taps MSDD system. As FIR taps are inevitable for optimized averaging of the noise, it is apparent that we must invest slightly more than 2 CMs per tap (one for the actual tap multiplication, and a second one for the adaptation) in order to attain the noise reduction with optimized coefficients. The alternative is to settle for the non-optimized version of FIG. 7, in which we just have a single CM overall, but performance is slightly degraded.

7. Polyphase Parallelization

Due to its usage of decision-feedback, the MSDD algorithm poses an implementation challenge for coherent optical receivers operating at tens of GBd rates, given that the fastest multipliers currently available with state-of-the-art ASIC technology operate at the rate of 2 to 3 GHz. As shown in [9], decision feedback (DF) based algorithms are not directly amenable to parallelization. Indeed, DF creates a dependency between modules, precluding independent parallel operation of identical processing sub-modules. Thus, a polyphase decomposition, i.e., time-parallelization of the processing using identical processing units operating on the polyphase components, would not equivalent to (in fact would have reduced performance relative to) our nominal MSDD, hypothetically operating at the full high rate. Nevertheless, realization-wise we adopt such parallelization strategy as shown in FIG. 9b, having P MSDD sub-modules, each operating on one of P polyphases, enabling digital hardware processing at P times lower clock rate. Thus, by taking the number P of parallel blocks sufficiently large, the processing clock rate per sub-module is sufficiently reduced to accommodate the available ASIC processing speeds. For this parallelization method, as each of the P parallel units operates at a rate a factor of P slower, the total (low) hardware complexity of the MSDD is essentially retained the number of CMs per second is still the same. However, this CR system will have somewhat worse performance than the nominal full-speed MSDD.

Figure 9A:
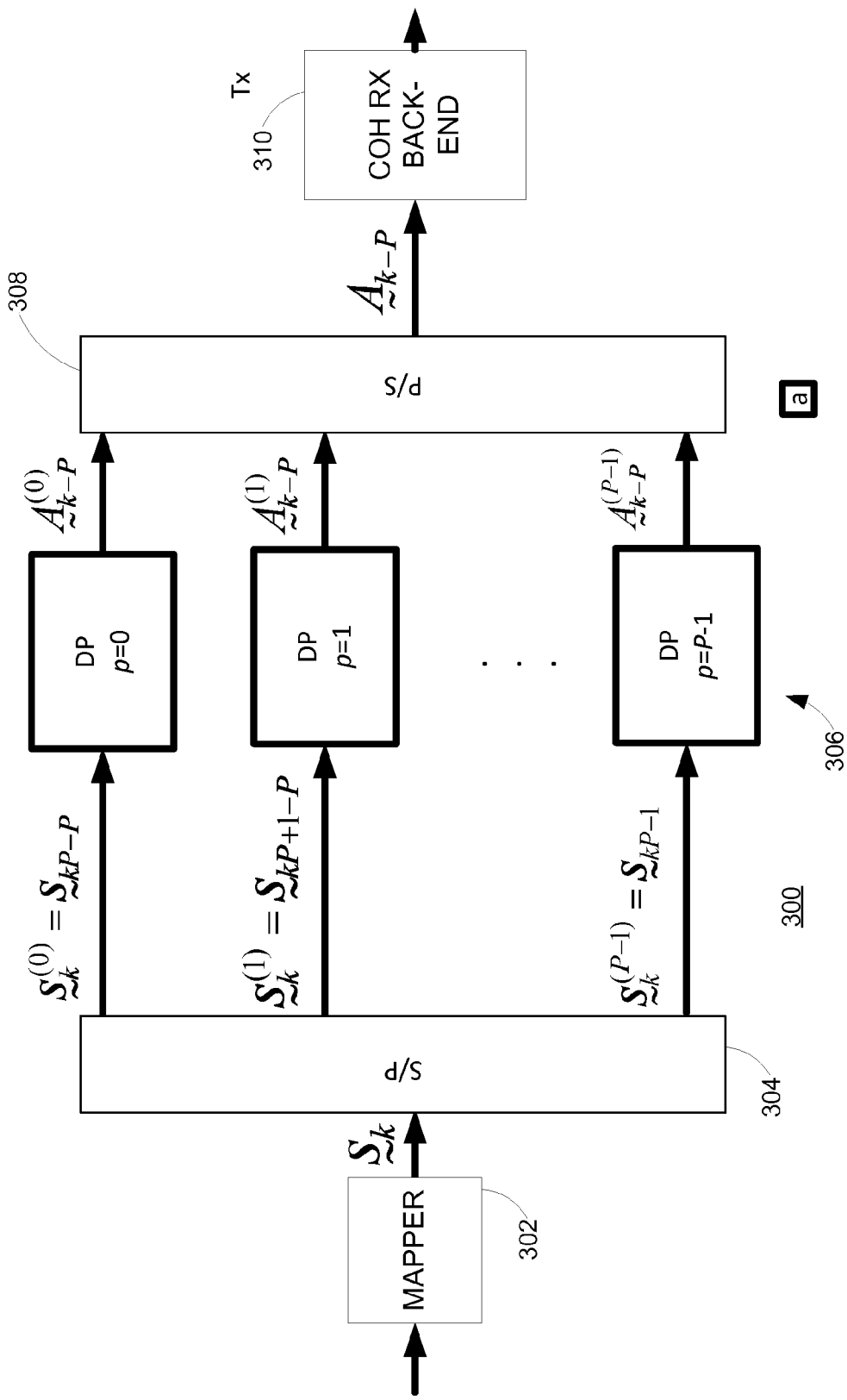
FIGS. 9A and 9B illustrates a receiver, a transmitter and a link according to an embodiment of the invention.
Figure 9B:
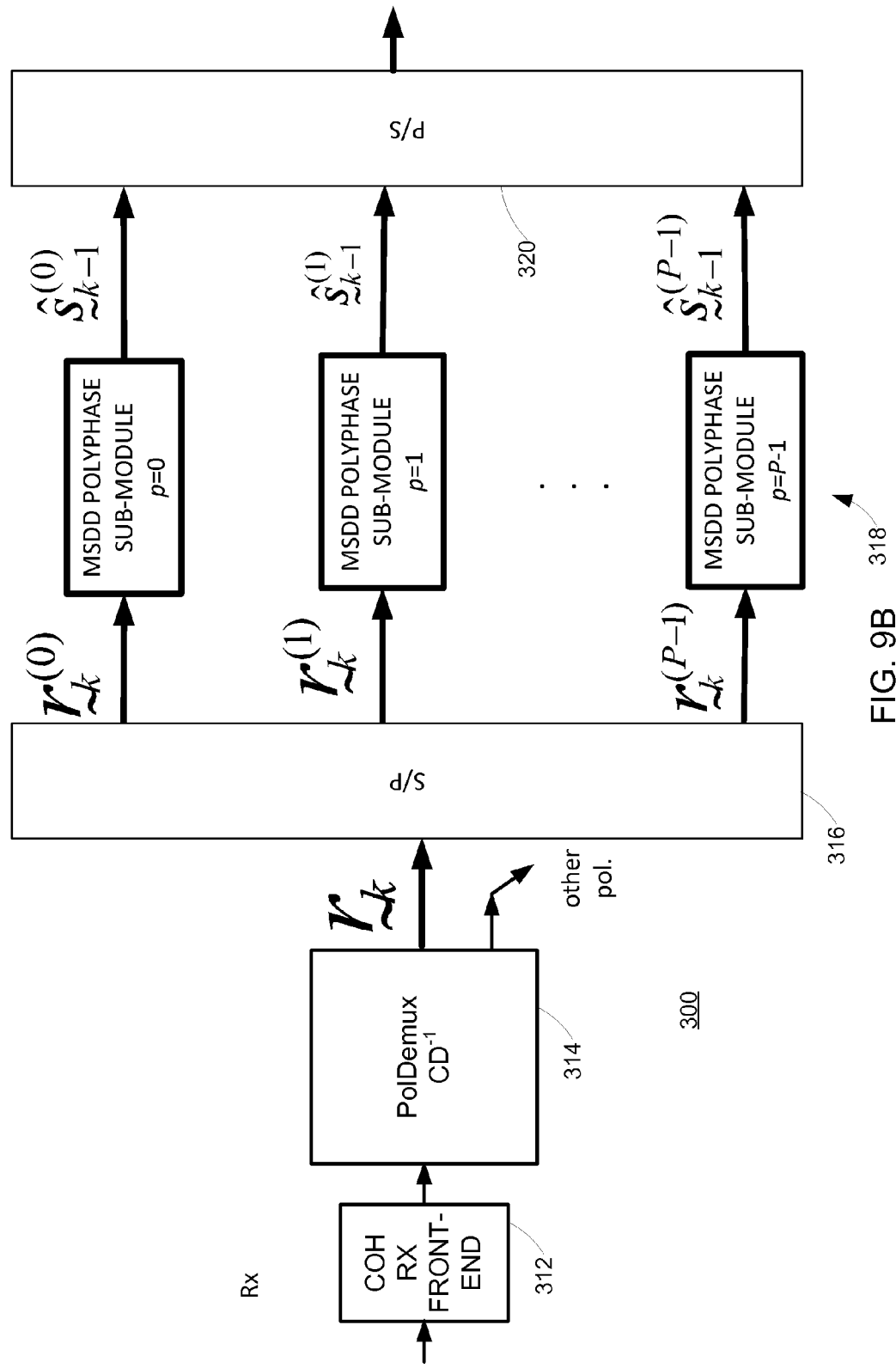

In order to enable MSDD polyphase operation at the Rx, the Tx is modified to also support a polyphase version of differential precoding, comprising P parallel MP-DPs modules, each operating at reduced rate by a factor of 1/P, as shown in FIG. 9a. The output of all P units is interleaved in order to create a continuous stream at the high rate. Each DP module essentially accumulates the prior phases in jumps of P samples (operating on a particular polyphase).

FIGS. 9A-9B illustrates a transmitter (Tx) implementation for the MSDD polyphase receiver implementation, and a receiver that includes a Polyphase implementation of the MSDD CR. Mapper 302 is followed by serial to parallel module 304 that is followed by multiple parallel DP modules 306, all DP modules are followed by parallel to serial module 308. P/S module 308 is followed coherent receiver backend 310.

The coherent receiver backend 310 is followed by coherent receiver front end, polyphase demultiplexer 314, S/P module 316, multiple parallel MSDD polyphase sub-modules 318 and P/S 320.

In general the processing is partitioned (into P parallel sub-modules, each acting on a received polyphase. Notice that the clock rates of the DP modules in the Tx and MSDD modules in the Rx are reduced by a factor of P.

7.1 The Distant Feedback (DF) Problem in Parallelized MSDD Processing

When using the polyphase implementation just introduced, the inputs to each MSDD sub-module are in jumps of P. The larger separation between MSDD input samples does not affect the white ASE noise performance, as there is no correlation between distinct ASE samples of white noise no matter how far apart. However, LPN noise performance is degraded under the polyphase implementation, as samples further away from each other are less correlated, and their relative phase noise is increased. Since the laser phase noise is a Weiner process with independent increments, $\Omega_k = \phi_k - \phi_{k-1}$, with variance proportional to the time interval T between samples (processing latency), i.e. inversely proportional to the sampling rate, it follows that reduction in sampling rate by a factor of P, due to parallelization, increases the variance of the laser phase noise by a factor of P. This amounts to having an effective laser linewidth P times wider. We refer to this laser phase noise tolerance penalty as the distant feedback effect, exacting a penalty due to the multiple parallel processing paths, which are inevitable at current CMOS clock speeds. Thus, the LPN tolerance will be degraded by a factor of P due to the parallelization, nevertheless, as the normalized phase noise tolerance of the MSDD method is very high to begin with (unless the laser phase noise is dominant relative to the ASE), the penalty will be seen to be small.

8. Simulation Results

Figure 10:
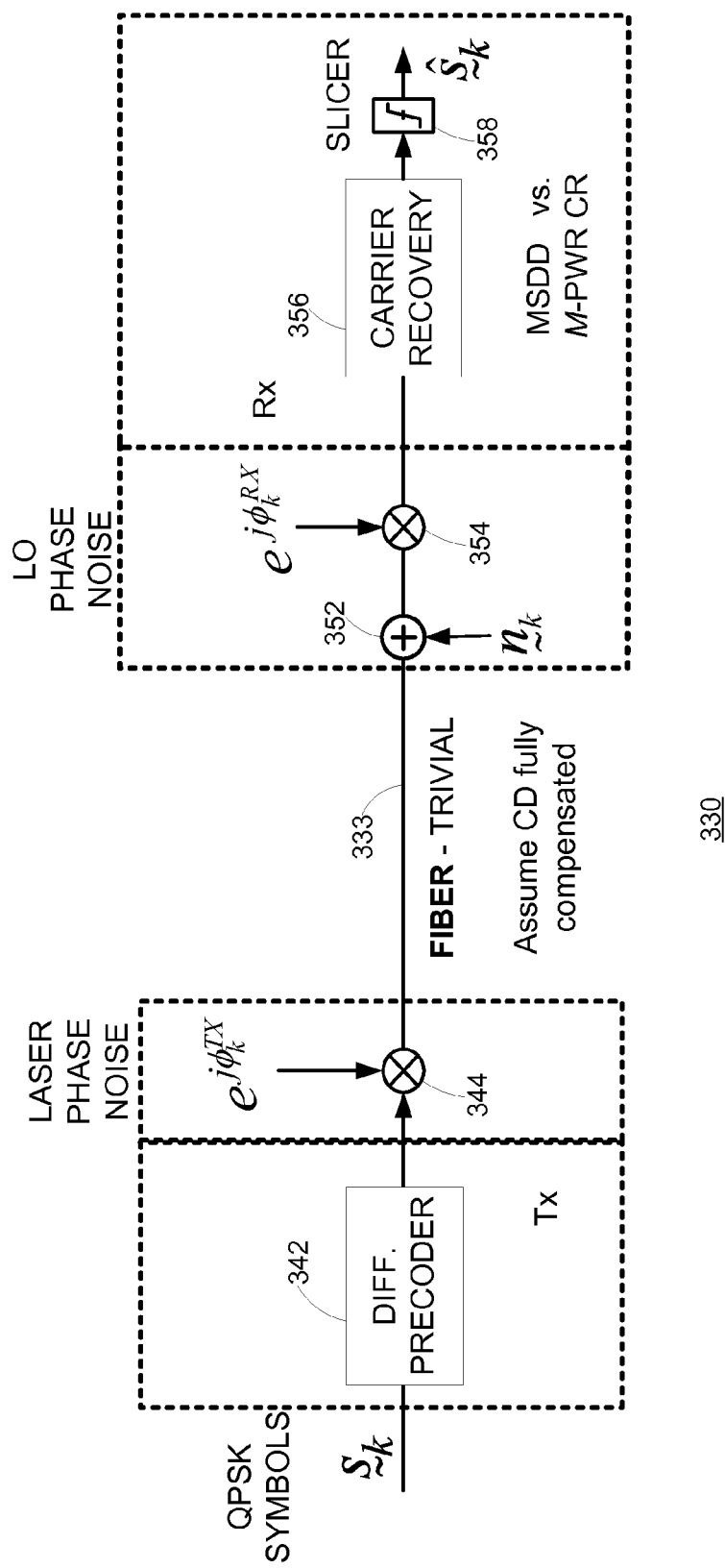
FIG. 10 illustrates a receiver, a transmitter and a link according to an embodiment of the invention.
Figure 11:
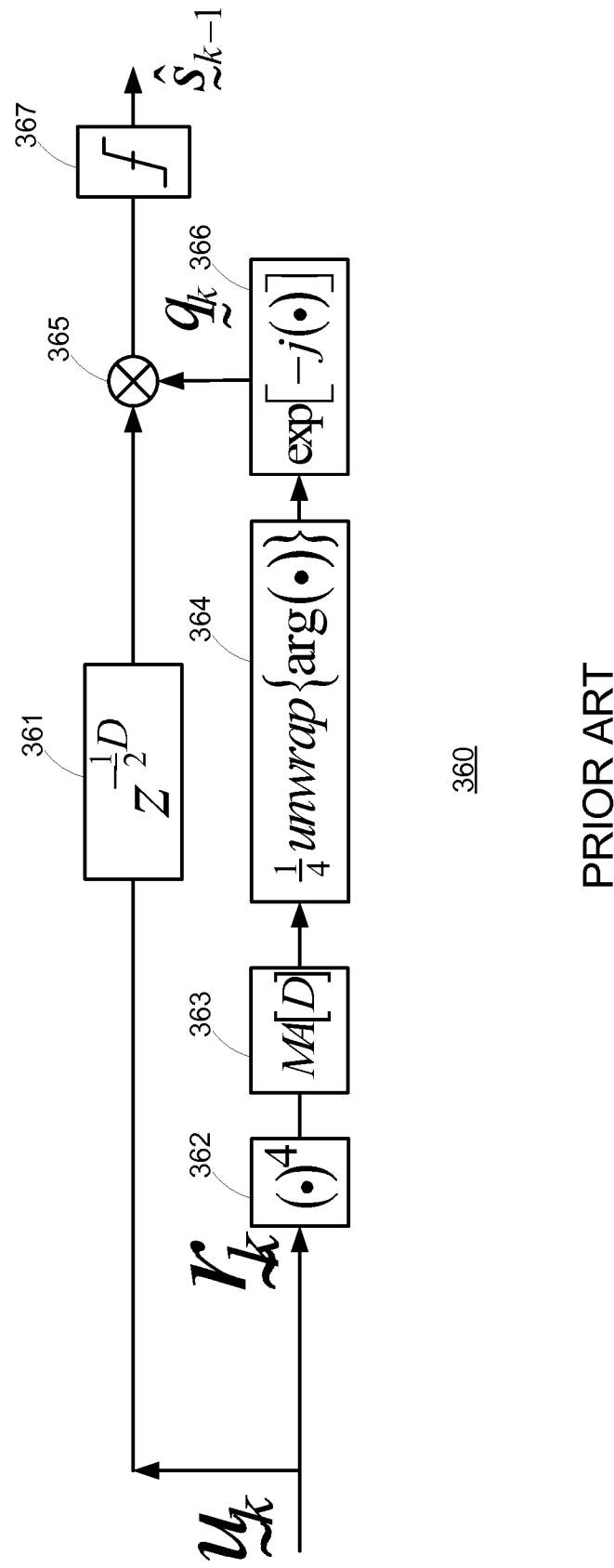
FIG. 11 illustrates a prior art carrier recovery module.

The simple channel model of subsection 2.2 is assumed here (FIG. 10). This channel model may include differential precoder 342 followed by multiplier 344, fiber 333, adder 352, multiplier 354, carrier recovery module 356 and slicer 358. This model does not address fiber non-linearities, Tx band-limitation, Rx optical and electrical filtering, the effect of the Rx CD equalizer (equalization enhanced phase noise [34]) nevertheless this simple model still captures the salient phase noise features, allowing meaningful comparison of the resulting MSDD performance vs. that of the prior art Viterbi&Viterbi M-power CPE of FIG. 11. This prior art CPE 360 is known in the art and required no further explanations. It is illustrated as including input port and multiplier 356. Two branches are connected in parallel between the input port and multiplier 356 one branch includes half cycle delay module 361 while the other branch includes a sequence of the following modules: power of four module 362, MA(D) module 363, ¼ unwrap {arg( )} module 364 and exp[−j( )] module 366. The output of multiplier 365 is connected to slicer 366.

The performances of the Viterbi&Viterbi M-power QPSK CR 360 is compared to various carrier recovery modules according to an embodiment of the invention.

In all Monte-Carlo and LMS simulations we assume a 100 G PDM-QPSK system at 28 GBd baudrate per polarization, simulating a single polarization. We also assume a parallelization factor of P=16, i.e. the DP transmission and MSDD detection is parallelized, as per FIG. 9, into 16 processing sub-modules.

Figure 12:
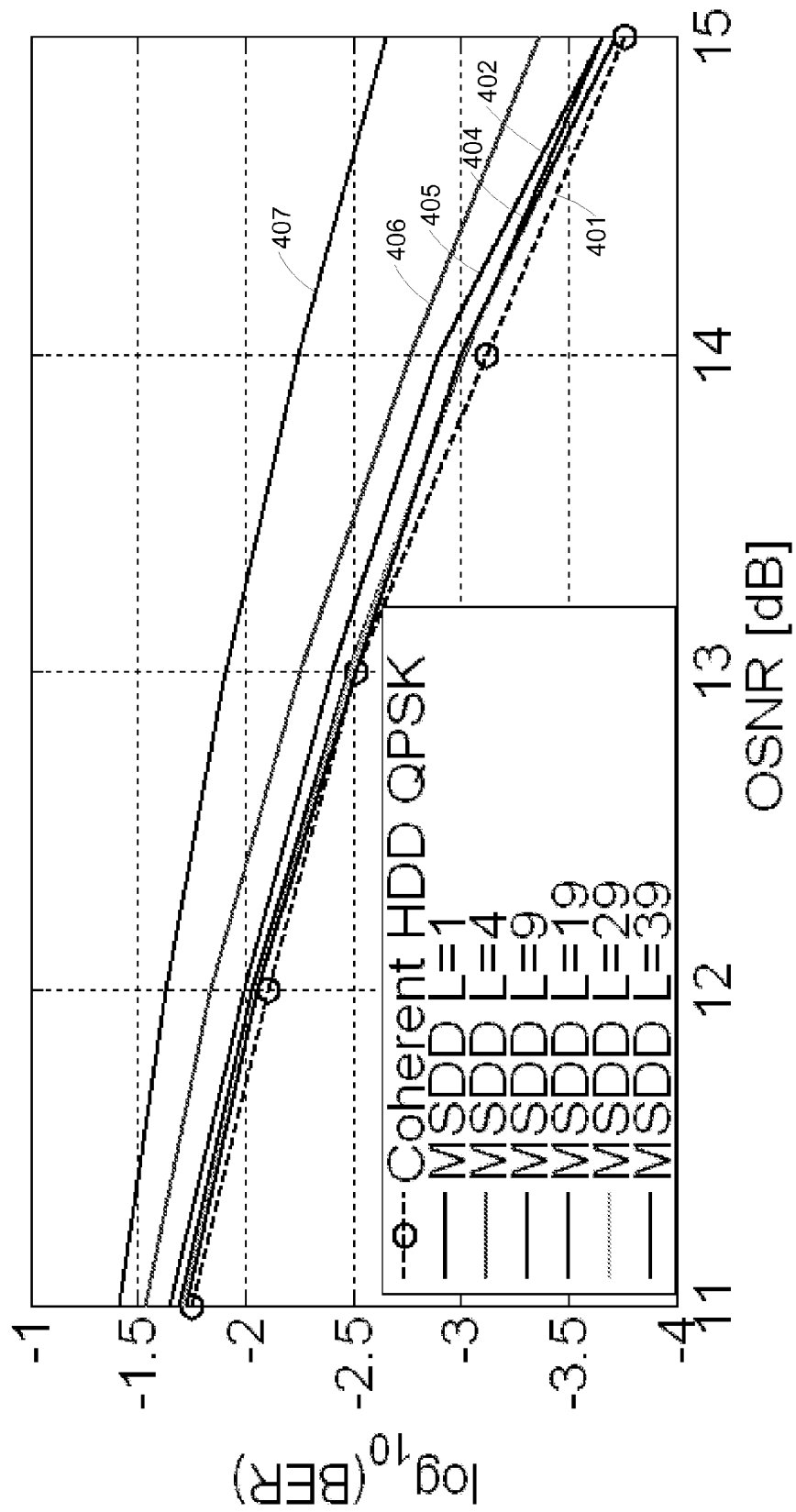
FIG. 12 illustrates a comparison between performances of a prior art carrier recovery module and a carrier recovery module according to an embodiment of the invention.

Curve 401 of FIG. 12 illustrates the bit error rate (log 10 BER) versus OSNR of the prior art Viterbi&Viterbi M-power QPSK CR 360 while curves 402-407 illustrates these performances for carrier recovery modules according to an embodiment of the invention for different L values. FIG. 12 simulates the QPSK MSDD system for zero LPN, just in the presence of ASE white noise, for various window sizes. As L is increased, the MSDD performance is seen to approach the so-called coherent HDD limit, namely coherent QPSK with differential precoding and hard (logic) differential decoding, i.e. the final complex-valued decision is expressed as $$\hat{s}_k \hat{s}_{k-1}^*.$$

Notice that the robustness of HDD is much higher than that of soft differential decoding, $r_k r_{k-1}^*$, which corresponds to L=1 (i.e., the window of past samples just includes the last sample), as the HDD hard decision is in error when either of the $\hat{s}_k$, $\hat{s}_{k-1}$ hard decisions are in error, which occurs with probability double that of either of them being in error. A linear factor of 2 on the BER scale corresponds to about 0.8 dB penalty at BER=10E-3, which is much smaller than the ~3 dB penalty of differential decoder, as derived in sub-section 2.4. The ~2.2 dB gap between soft and hard differential decoding is bridged over by the MSDD—the higher the window size L, the more the HDD limit is approached. Here, in the absence of LPN, the white-noise performance is monotonic increasing in L.

Figure 13:
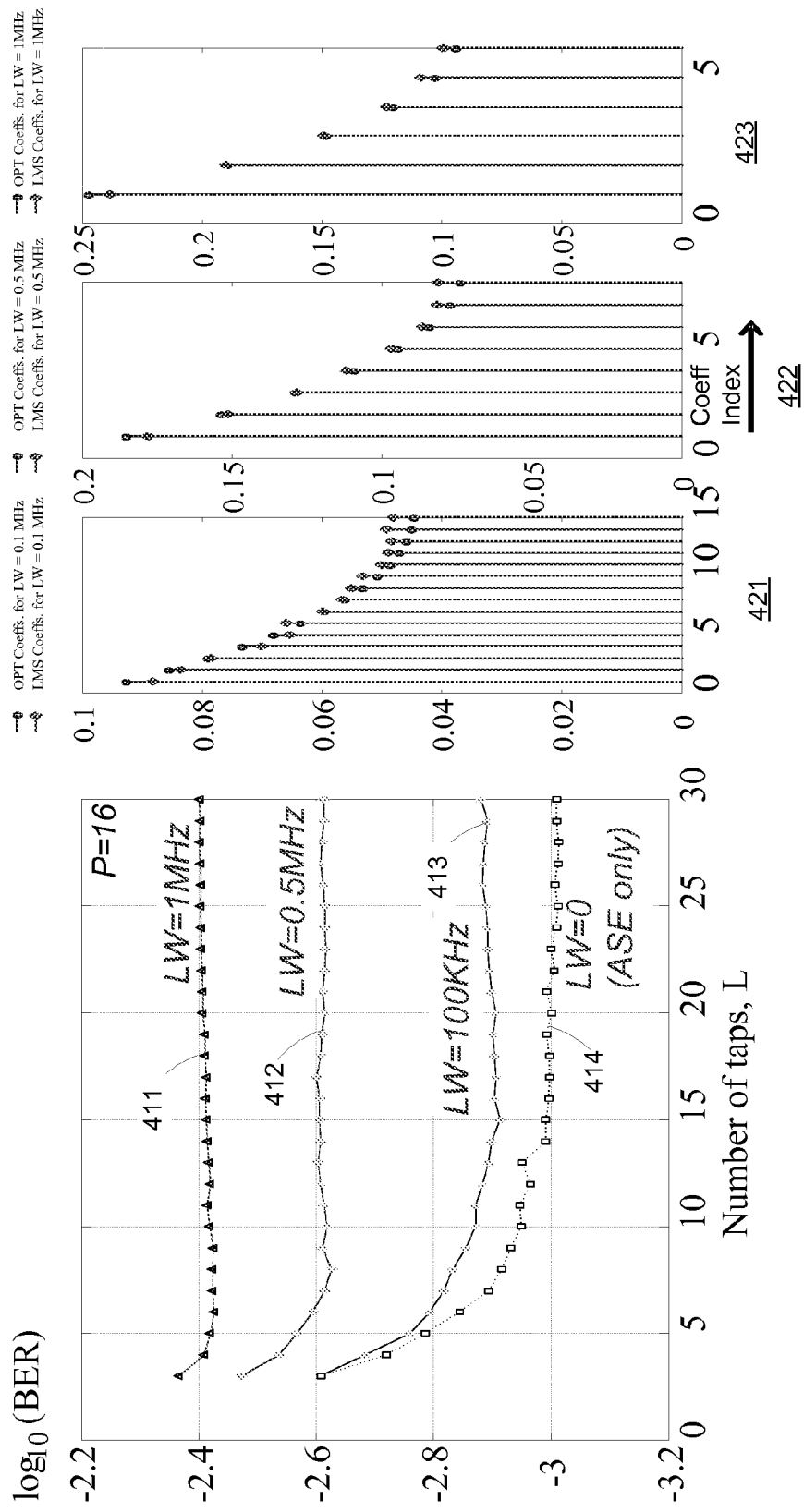
FIG. 13 illustrates a performance of a carrier recovery module according to an embodiment of the invention.

FIG. 13 presents simulated aspects of the adaptive LMS performance. The number L of LMS coefficients is selected to range from 6 and 15 to get most of the benefit, as is apparent from curves 411-414 of FIG. 13. Graphs 421, 422 and 423 illustrates that the adaptive coefficients almost perfectly converge onto the optimal Wiener solution. It is also apparent that the coefficient amplitudes decay such as to optimize the noise decorrelation due to the LPN.

Figure 14:
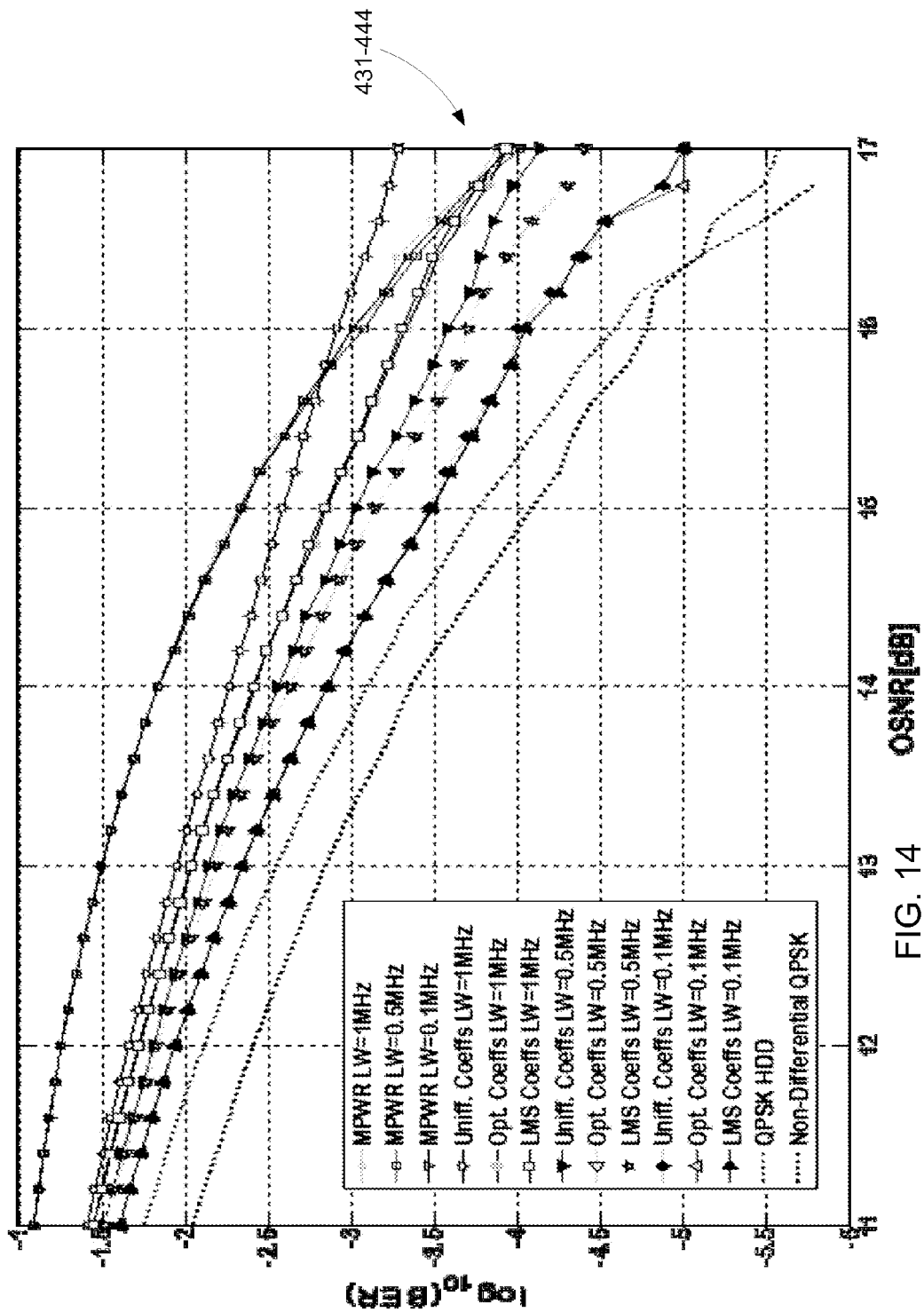
FIG. 14 illustrates a comparison between performances of a prior art carrier recovery module and a carrier recovery module according to an embodiment of the invention.

The final performance attainable with uniform (all equal to 1/L) coefficients, vs. Wiener-optimal and LMS coefficients is shown in FIG. 14 (curves 431-444), for linewidths of 0.1, 0.5 and 1 MHz. Two important effects are apparent: (i): For all linewidths, the performances with LMS and Wiener-optimal coefficients are almost indistinguishable. (ii): For 0.1 MHZ LW, the performance with uniform coefficients (corresponding to multiplier-free CPE) is also indistinguishable from that with LMS and with Wiener-optimal coefficients, whereas for 0.5 MHz linewidth, the penalty due to uniform coefficients is just 0.25 dB. However, for 1 MHz linewidth, the uniform coefficients penalty is −1 dB. This indicates that the ultra-low complexity multiplier-free CPE (with single full-fledged multiplier required for demodulation but no non-trivial multipliers required for the CPE) is the best choice up to about 0.5 MHz linewidth, as its performance penalty is very small (negligible for coherent-grade 100 KHz lasers), whereas the complexity savings in the multiplier-free version is very large. For linewidths above 0.5 MHz, the coefficients optimization, whether adaptive or Wiener-based, does improve performance, the more so the wider the linewidth, but then one has to invest either 1 CM (for Wiener) or 2 CMs (for LMS) per tap (6 to 9 taps would suffice for optimal performance) to optimize performance. In any case the MSDD performance exceeds that of M-power.

9. Conclusions

In this paper we introduced the MSDD principle, explaining in detail how a moving window of L prior symbols may be linearly processed in order to generate a cleaner demodulation reference, relative to other carrier-recovery methods. The two MSDD versions presented here (multiplier-free vs. optimized) provide the least complex CR system vs. the best performance, as borne by numeric simulations indicating up to 1.9 dB advantage over the Viterbi&Viterbi algorithms and ultra-low complexity multiplier-free CPE realization.

Moreover, the MSDD features linear (time-varying) processing hence is free of cycle-slips and other phase unwrapping impairments.

The only weakness of MSDD is its reliance on decision-feedback, which exacts a "distant-feedback" linewidth penalty upon polyphases parallelization. Nevertheless, the simulated performance indicates that the resulting degradation is negligible up to ~0.5 MHz linewidth, thus for practical coherent systems, the limited linewidth tolerance may not be an issue—it is the improved resilience in the lower OSNR regime that makes MSDD the preferred scheme.

FIG. 14. MSDD CR vs. Viterbi&Viterbi M-power CR BER vs. OSNR performance. The bottom two curves represent theoretical limits corresponding to a purely white noise idealized channel without and with hard differential detection. The top curve corresponds to the Viterbi&Viterbi M-pwr algorithm (worst performance). The MSDD performance is generally better, but successively degrades as linewidth is increased (0.1, 0.5, 1 MHz). At 1 MHz, the curves for Wiener-Optimal, LMS and Uniform coefficients coincide. It is then apparent that for systems based on coherent-grade 100

KHz lasers, MSDD OSNR is 1.9 dB better than that of the MPWR system at BER=10 E-3. Moreover, this performance may be attained with the multiplier-free CPE (Uniform coefficients), and there is no need to use the more complex version with optimized coefficients. At 0.5 MHz linewidth, the OSNR gap between uniform and optimized coefficients is just 0.15 dB indicating that even in this case it is still worth adopting the CPE-multipliers-free hardware simplified MSDD. However, at 1 MHz the gap between uniform and optimized coefficients widens to almost 1 dB indicating that in this case the more complex MSDD system with LMS or Wiener optimized coefficients is required for best performance. In all cases the Wiener and LMS coefficients track each other almost perfectly, mutually validating the mathematical analyses leading to the Wiener solution and the LMS update equations.

This work was devoted to coherent QPSK transmission, yet the MSDD CPE method may be extended to higher modulation formats. MSDD QAM operation was previewed in [30] [31], however this extensive key topic will be fully elaborated in a future publication, covering unique aspects of adaptive MSDD for QAM: consolidation of carrier phase and carrier frequency estimation in a single MSDD system, seamless transition between QAM constellation sizes and automatic adaptive scaling of the received QAM constellation.

Despite the proliferation of CR techniques, e.g. [1-10], we are convinced that the MSDD approach features the best performance-complexity tradeoffs and will evolve to be increasingly adopted as the carrier recovery method of choice.

Figure 15:
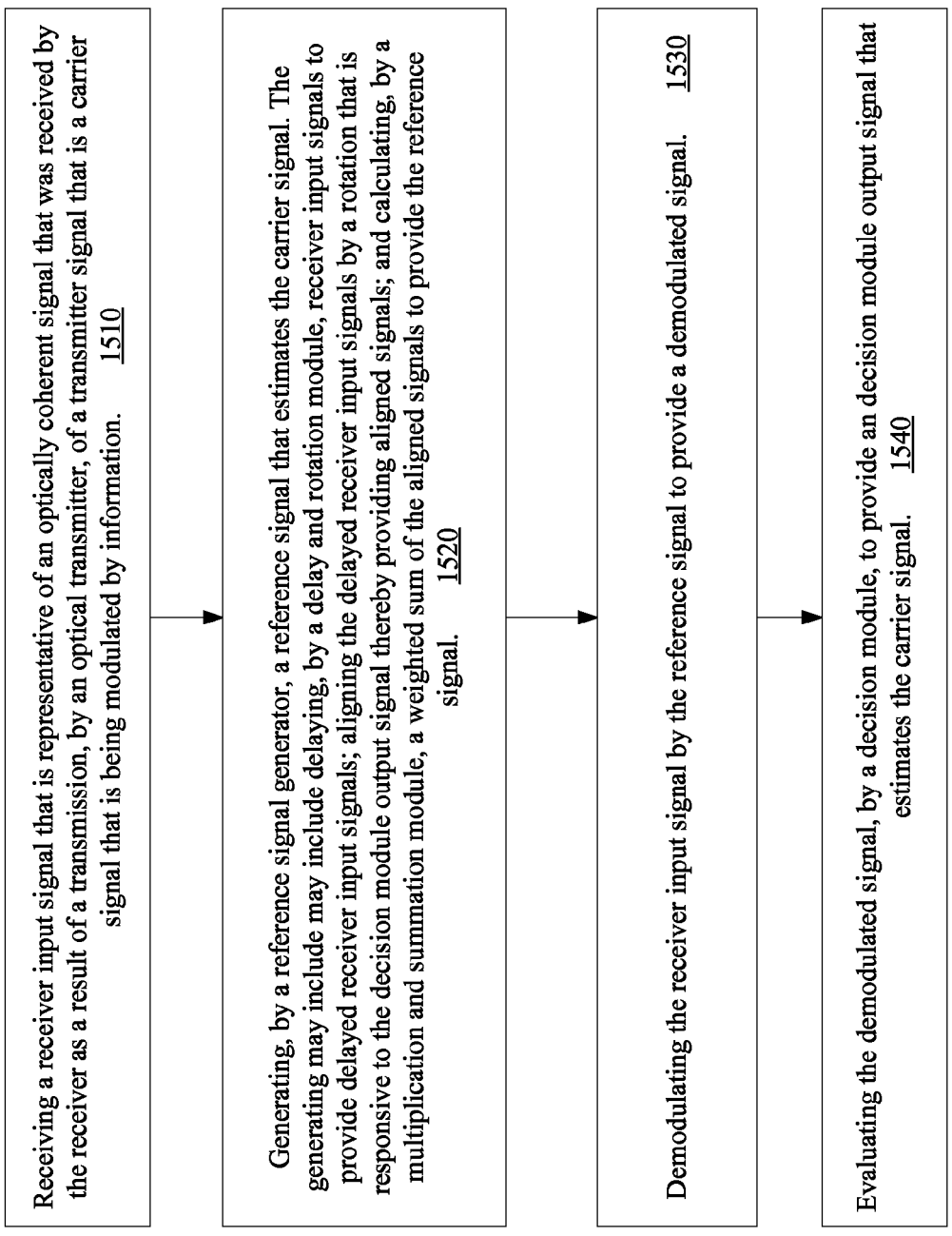
FIG. 15 illustrates a method according to an embodiment of the invention.

FIG. 15 illustrates method 1500 according to an embodiment of the invention.

Method 1500 starts by stage 1510 of receiving a receiver input signal that is representative of an optically coherent signal that was received by the receiver as a result of a transmission, by an optical transmitter, of a transmitter signal that is a carrier signal that is being modulated by information.

Stage 1510 may be followed by stage 1520 of generating, by a reference signal generator, a reference signal that estimates the carrier signal.

Stage 1520 may be followed by stage 1530 of demodulating the receiver input signal by the reference signal to provide a demodulated signal Stage 1530 may be followed by stage 1540 of evaluating the demodulated signal, by a decision module, to provide an decision module output signal that estimates the carrier signal Stage 1520 may include delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal.

APPENDIX A

Uop and Modulus Preserving Differential Encoding Math Properties

Some Uop properties: The Uop distributes over products, i.e. the Uop of a product is the product of Uops: $v=zw \Rightarrow \check{v}=\check{z}\check{w}$; Uop is an idempotent operation: The last two relations lead to $v=z\check{w} \Rightarrow \check{v}=\check{z}\check{w}$.

Next, let us evaluate the computational complexity of generating the Uop, $$(\bullet)/|\bullet| = (\bullet) \cdot \left(1/\sqrt{|\bullet|^2}\right) \quad (30)$$
$$= [\text{Re}(\bullet), \text{Im}(\bullet)] \cdot \left[1/\sqrt{[\text{Re}(\bullet)]^2 + [\text{Im}(\bullet)]^2}\right].$$

The operational form above indicates that we require a complex-real multiplier (i.e. two real-multipliers (RMs)), a look-up table (LUT) and the absolute square operation comprising two RMs. Just counting multipliers, resulting overall Uop complexity is 4 RMs. As a single complex multiplier takes three real-multipliers to execute, it is apparent that the Uop complexity essentially amounts to CMs.

Consider now the DP recursion (3), relating two line symbols separated by one discrete-time unit. More generally by repeated application of (3), shifted back in time we have $$\check{A}_{k-i}\check{s}_{k-i+1} = A_{k-i+1} \Rightarrow \check{A}_{k-i+1}\check{s}_{k-i+2} = A_{k-i+2} \Rightarrow \ldots \check{A}_{k-2}\check{s}_{k-1} = A_{k-1} \quad (31)$$

i.e. we have a more general recursion, essentially relating two line symbols which are i time units apart by a complex rotation through the unimodular product:

$$A_{k-i}\widehat{\check{s}}_{k-i+1}\widehat{\check{s}}_{k-i+2}\ldots\widehat{\check{s}}_{k-1} = A_{k-1} \quad (32)$$

It is readily verified that the delay-detection operation, $A_k \check{A}_{k-1}^*$, undoes DP. Indeed, $$A_k\check{A}_{k-1}^* = (s_k\check{A}_{k-1})\check{A}_{k-1}^* = s_k(\check{A}_{k-1}\check{A}_{k-1}^*) = s_k. \quad (33)$$

Thus, and more generally we have the recursion $$s_k = A_k\check{A}_{k-i}\check{s}_{k-i+1}^*\check{s}_{k-i+2}^*\ldots\check{s}_{k-1}^* \quad (34)$$

which is readily proven using (32), as follows:

$$A_k\check{A}_{k-i}^*\check{s}_{k-i+1}^*\check{s}_{k-i+2}^*\ldots\check{s}_{k-1}^* = A_k\left(\check{A}_{k-i}\check{s}_{k-i+1}\check{s}_{k-i+2}\ldots\check{s}_{k-1}\right)^* \quad (35)$$
$$= A_k\check{A}_{k-i}^*$$
$$= s_k$$

APPENDIX B

Derivation of the Wiener-Hopf Equations for the Optimal Coefficients

To derive the MMSE solution, minimizing (18), we invoke the orthogonality principle of linear estimation. The optimal coefficients vector is obtained from the condition that $c^\dagger \hat{s}_k$ be the projection of the estimation target $s_k$ onto the "observations" subspace, i.e. the estimation error be orthogonal to each of the "observations" (which correspond here to the inputs into the linear estimator $$\hat{s}_k = \sum_{i=1}^{L} \bar{c}_i \hat{\underline{s}}_k^{(i)} = c^\dagger \hat{\underline{s}}_{k)}.$$

$$0 = [\langle \varepsilon_k \hat{s}_k^{(1)*} \rangle, \langle \varepsilon_k \hat{s}_k^{(2)*} \rangle, \ldots, \langle \varepsilon_k \hat{s}_k^{(L)*} \rangle] \quad (36)$$

$$= \langle \varepsilon_k [\hat{s}_k^{(1)*}, \hat{s}_k^{(2)*}, \ldots, \hat{s}_k^{(L)*}] \rangle$$

$$= \langle \varepsilon_k \hat{s}_k^\dagger \rangle$$

Substituting the estimation error $\varepsilon_k = s_k - c^\dagger \hat{s}_k$ into the last equation yields the W-H equation:

$$0 = \langle \varepsilon_k \hat{s}_k^\dagger \rangle = \langle (s_k - c^\dagger \hat{s}_k) \hat{s}_k^\dagger \rangle = \langle s_k \hat{s}_k^\dagger \rangle - c^\dagger \langle \hat{s}_k \hat{s}_k^\dagger \rangle \Leftrightarrow c^\dagger \langle \hat{s}_k \hat{s}_k^\dagger \rangle = \quad (37)$$

$$\langle s_k \hat{s}_k^\dagger \rangle \Leftrightarrow \langle \hat{s}_k \hat{s}_k^\dagger \rangle c = \langle \hat{s}_k s_k \rangle \Leftrightarrow \Gamma_{\hat{s}_k} c = \Gamma_{\hat{s}_k, s_k}$$

It remains to evaluate the second-order statistics. Working out the cross-correlation vector first, its i-th element is given by $$v_i \equiv [\Gamma_{\hat{s}_k, s_k}]_i = \langle \hat{s}_k^{(i)} s_k^* \rangle = \langle s_k \cdot p_k \breve{p}_{k-i}^* \cdot s_k^* \rangle = \langle |s_k|^2 \rangle \langle p_k \breve{p}_{k-i}^* \rangle. \quad (38)$$

Next evaluating the autocorrelation matrix elements, we have $$\Phi_{ij} \equiv [\Gamma_{\hat{s}}]_{ij} \quad (39)$$

$$= \langle \hat{s}_k^{(i)} \hat{s}_k^{(j)*} \rangle$$

$$= \langle s_k \cdot p_k \breve{p}_{k-i}^* \cdot (s_k \cdot p_k \breve{p}_{k-j}^*)^* \rangle$$

$$= \langle |s_k|^2 \rangle \langle p_k \breve{p}_{k-i}^* (p_k \breve{p}_{k-j}^*)^* \rangle$$

These statistics are in turn determined by the second- and fourth-order statistics of the multiplicative phase noise sequence (7), $p_k$. Start with evaluating the conjugate product:

$$p_{k_1} p_{k_2}^* = \quad (40)$$

$$\left(1 + \eta_{k_1}\right) e^{j\phi_{k_1}^{LPN}} \left(1 + \eta_{k_2}^*\right) e^{-j\phi_{k_2}^{LPN}} = \left(1 + \eta_{k_1} + \eta_{k_2}^* + \eta_{k_1} \eta_{k_2}^*\right) e^{j\phi_{k_1 \to k_2}}$$

where we introduced a notation for the LPN increment between two discrete-times:

$$\phi_{k_1 \to k_2}^{LPN} \equiv \phi_{k_2}^{LPN} - \phi_{k_1}^{LPN} = \sum_{k=k_1+1}^{k_2} \Omega_k \quad (41)$$

This phase noise increment is zero-mean Gaussian distributed with variance:

$$\langle |\phi_{k_1 \to k_2}^{LPN}|^2 \rangle = |k_2 - k_1| \langle \Omega_l^2 \rangle = |k_2 - k_1| 2\pi \Delta v \cdot T = |k_2 - k_1| 2\pi \Delta \hat{v} \quad (42)$$

Using well-known Wiener phase noise statistical techniques [35] the expected phase noise exponent in (40) is then given by:

$$\langle \exp[j\phi_{k_1 \to k_2}] \rangle = e^{-\pi \Delta \hat{v} \cdot |k_1 - k_2|} \quad (43)$$

Taking the expectation of (40) yields the autocorrelation of the PN factors:

$$\langle p_{k_1} p_{k_2}^* \rangle = \left(1 + \underbrace{\langle \eta_{k_1} \rangle}_{0} + \underbrace{\langle \eta_{k_2}^* \rangle}_{0} + \underbrace{\langle \eta_{k_1} \eta_{k_2}^* \rangle}_{\sigma_\eta^2 \delta_{k_1-k_2}}\right) \langle e^{j(\phi_{k_1}^{LPN} - \phi_{k_2}^{LPN})} \rangle \quad (44)$$

$$\langle p_{k_1} p_{k_2}^* \rangle = \Gamma_p[k_1 - k_2] = (1 + \sigma_\eta^2 \delta_{k_1-k_2}) e^{-\pi \Delta \hat{v}|k_1 - k_2|}$$

$$\langle p_k \breve{p}_{k-i}^* \rangle \Gamma_p[i] = (1 + \sigma_\eta^2 \delta_i) e^{-\pi \Delta \hat{v}|i|}$$

We now expand the quadruple product of multiplicative PN factors:

$$p_{k_1} p_{k_2}^* (p_{k_1'} p_{k_2'}^*)^* = \quad (45)$$

$$(1 + \eta_{k_1} + \eta_{k_2}^* + \eta_{k_1} \eta_{k_2}^*) e^{j\phi_{k_1 \to k_2}} (1 + \eta_{k_1'}^* + \eta_{k_2'} + \eta_{k_1'}^* \eta_{k_2'}) e^{-j\phi_{k_1' \to k_2'}}$$

$$= (1 + \eta_{k_1} + \eta_{k_2}^* + \eta_{k_1'}^* + \eta_{k_2'} + \eta_{k_1} \eta_{k_1'}^* + \eta_{k_1} \eta_{k_2'} + \eta_{k_2}^* \eta_{k_1'}^* +$$

$$\eta_{k_2}^* \eta_{k_2'} + \eta_{k_1} \eta_{k_1'}^* \eta_{k_2} + \eta_{k_2}^* \eta_{k_1'}^* \eta_{k_2'} + \eta_{k_1} \eta_{k_2}^* \eta_{k_1'}^* +$$

$$\eta_{k_1} \eta_{k_2}^* \eta_{k_2'} + \eta_{k_1} \eta_{k_2}^* \eta_{k_1'}^* \eta_{k_2'}) e^{j(\phi_{k_1 \to k_2} - \phi_{k_1' \to k_2'})}$$

We next take the expectation of this quadruple product. Since the phase noise is independent of $\eta$, the expectation factors out over the LPN exponents and the sum of $\eta$ terms and products thereof, out of which the only terms not having null expectation are the conjugate double products (to show that the other double, triple and quadruple products have zero mean, one invokes the whiteness and circularity of the noise sequence):

$$\langle p_{k_1} p_{k_2}^* p_{k_1'}^* p_{k_2'} \rangle = \quad (46)$$

$$\langle p_{k_1} p_{k_2}^* (p_{k_1'} p_{k_2'}^*)^* \rangle = \left(1 + \langle \eta_{k_1} \eta_{k_1'}^* \rangle + \langle \eta_{k_2}^* \eta_{k_2'} \rangle\right) \langle e^{j(\phi_{k_1 \to k_2} - \phi_{k_1' \to k_2'})} \rangle$$

$$= [1 + \sigma_\eta^2 (\delta_{k_1-k_1'} + \delta_{k_2-k_2'})] \langle e^{j(\phi_{k_1 \to k_2} - \phi_{k_1' \to k_2'})} \rangle$$

In the special case of interest, (46) reduces to:

$$\langle p_k \breve{p}_{k-i}^* (p_k \breve{p}_{k-j}^*)^* \rangle = [1 + \sigma_\eta^2 (\delta_{k-k} + \delta_{i-j})] \langle e^{j(\phi_{k \to k-i} - \phi_{k \to k-j})} \rangle \quad (47)$$

$$= [1 + \sigma_\eta^2 (1 + \delta_{i-j})] \langle e^{-j(\phi_{k-i \to k} - \phi_{k-j \to k})} \rangle = [1 + \sigma_\eta^2 (1 + \delta_{i-j})] e^{-\pi \Delta \hat{v}|i-j|}$$

Substituting (44), (47) of the p-sequence into (38), (39) respectively, yields our final results for the second-order statistics required in formulating the Wiener-Hopf equations:

$$v_i \equiv [\Gamma_{\hat{s}_k, s_k}]_i = \langle \hat{s}_k^{(i)} s_k^* \rangle = \langle |s_k^*|^2 \rangle (1 + \sigma_\eta^2 \delta_i) e^{-\pi \Delta \hat{v}|i|} \quad (48)$$

$$\Phi_{ij} \equiv [\Gamma_{\hat{s}}]_{ij} = \langle \hat{s}_k^{(i)} \hat{s}_k^{(j)*} \rangle = [1 + \sigma_\eta^2 (1 + \delta_{i-j})] e^{-\pi \Delta \hat{v}|i-j|}.$$

APPENDIX C

Abbreviations Used in this Paper

The two leftmost columns list the 18 abbreviations specific to this paper the third column contains abbreviations in general use.

| | | |
|---|---|---|
| CFO = Carrier Frequency Offset | MMSE = Minimal Mean Square Error | ASE = Amplified Spontaneous Emission |
| CM = Complex Multiplier | MP-DP = Modulus Preserving Diff. Precoder | FIR = Finite Impulse Response |
| CPE = Carrier Phase Estimation | MSDD = Multi-Symbol Delay/Differential Detection | QPSK = Quadrature Phase Shift Keying |
| CR = Carrier Recovery | MSE = Mean Square Error | QAM = Quadrature Amplitude Modulation |
| DD = Delay/Differential Detector/Demodulator | MSPE = Multi-Symbol Phase Estimation | OSNR—Optical Signal to Noise Ratio |
| DP = Differential Precoder | PN = Phase Noise | SNR = Signal to Noise Ratio |
| LMS = Least Mean Squares | SE = Squared Error | |
| LPN = Laser Phase Noise | Uop = Unimodular Normalization (Eq. 2) | |
| LW = Linewidth | W-H = Wiener-Hopf (Equations) | |

The two leftmost columns list the 18 abbreviations specific to this paper the third column contains abbreviations in general use.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections.

However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals.

Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible.

The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any of the systems above can be arranged to execute a method. Any method illustrated in the specification or the drawings can be implemented by executing instructions that are stored in a non-transitory computer readable medium.

We claim:

1. A receiver comprising a carrier recovery module, wherein the carrier recovery module comprises: a port arranged to receive a receiver input signal that is representative of an optically coherent signal that was received by the receiver as a result of a transmission, by an optical transmitter, of a transmitter signal that is a carrier signal that is being modulated by information; a reference signal generator that is arranged to generate a reference signal that estimates the carrier signal; a decision module that is arranged to demodulate the receiver input signal by the reference signal to provide a demodulated signal and to evaluate the demodulated signal to provide a decision module output signal that estimates the carrier signal; wherein the reference signal generator comprises: a delay and rotation module that is arranged to delay receiver input signals to provide delayed receiver input signals and to align the delayed receiver input signals by a rotation that is responsive to the decision module output signal thereby providing aligned signals; and a multiplication and summation module that is arranged to generate the reference signal by calculating a weighted sum of the aligned signals;
wherein the multiplication and summation module comprises multiple adders and only a single multiplier; wherein the multiple adders are arranged to add the aligned signals to provide an first sum and wherein the single multiplier is arranged to multiply the first sum by a single coefficient to provide the weighted sum of the aligned signals.

2. The receiver according to claim 1, wherein the decision module is a slicer.

3. The receiver according to claim 1, wherein the decision module comprises a normalizing module that is arranged to normalize the decision output signal to provide a normalized output signal that is used to rotate at least some of the delayed receiver input signals.

4. The receiver according to claim 1, wherein the single coefficient equals 1/L, wherein L is a number of the aligned signals.

5. A receiver comprising a carrier recover module, wherein the carrier recovery module comprises: a port arranged to receive a receiver input signal that is representative of an optically coherent signal that was received by the receiver as a result of a transmission, by an optical transmitter, of a transmitter signal that is a carrier signal that is being modulated by information; a reference signal generator that is arranged to generate a reference signal that estimates the carrier signal; a decision module that is arranged to demodulate the receiver input signal by the reference signal to provide a demodulated signal and to evaluate the demodulated signal to provide a decision module output signal that estimates the carrier signal; wherein the reference signal generator comprises: a delay and rotation module that is arranged to delay receiver input signals to provide delayed receiver input signals and to align the delayed receiver input signals by a rotation that is responsive to the decision module output signal thereby providing aligned signals; and a multiplication and summation module that is arranged to generate the reference signal by calculating a weighted sum of the aligned signals; wherein the multiplication and summation module comprises multipliers that are arranged to multiply the aligned signals by coefficients; wherein the receiver further comprises a coefficient calculator that is arranged to calculate the coefficients; wherein the coefficient calculator is fed by the decision module output signal;

wherein the coefficient calculator is arranged to calculate a current value of a certain coefficient, the certain coefficient is to be multiplied by a certain aligned signal, in response to a last value of the certain coefficient, a value of the certain aligned signal and a certain delayed receiver input signal that is associated with the certain aligned signal.

6. A receiver comprising a carrier recovery module, wherein the carrier recovery module comprises: a port arranged to receive a receiver input signal that is representative of an optically coherent signal that was received by the receiver as a result of a transmission, by an optical transmitter, of a transmitter signal that is a carrier signal that is being modulated by information; a reference signal generator that is arranged to generate a reference signal that estimates the carrier signal; a decision module that is arranged to demodulate the receiver input signal by the reference signal to provide a demodulated signal and to evaluate the demodulated signal to provide a decision module output signal that estimates the carrier signal; wherein the reference signal generator comprises: a delay and rotation module that is arranged to delay receiver input signals to provide delayed receiver input signals and to align the delayed receiver input signals by a rotation that is responsive to the decision module output signal thereby providing aligned signals; and a multiplication and summation module that is arranged to generate the reference signal by calculating a weighted sum of the aligned signals;

wherein the receiver further comprises an input module, an output module and multiple carrier recovery modules coupled between the input and output modules; wherein the input module is arranged to receive a sequence of receiver input signals and to send to each of the multiple carrier recovery modules a sub-sequence of receiver input signals; wherein the multiple carrier recovery modules are arranged to output decision module output signals; and wherein the output module is arranged to receive the decision module output signals from the multiple carrier recovery modules and to output a sequence of decision module output signals.

7. The receiver according to claim 6, wherein the multiplication and summation module comprises less than L multipliers, wherein L is a number of the aligned signals.

8. The receiver according to claim 6, wherein the multiplication and summation module comprises multipliers that are arranged to multiply the aligned signals by coefficients.

9. The receiver according to claim 8, comprising a coefficient calculator that is arranged to calculate the coefficients.

10. The receiver according to claim 9, wherein the coefficient calculator is fed by the decision module output signal.

11. The receiver according to claim 9, wherein the coefficient calculator is arranged to calculate the coefficients by applying a Wiener optimization process.

12. The receiver according to claim 9, wherein the coefficient calculator is arranged to calculate the coefficients by applying a least mean square error optimization process.

13. The receiver according to claim 6, wherein each sub-sequence of receiver input signals comprises at least one thousand consecutive input receiver signals.

14. A method for carrier recovery, the method comprises: receiving a receiver input signal that is representative of an optically coherent signal that was received by the receiver as a result of a transmission, by an optical transmitter, of a transmitter signal that is a carrier signal that is being modulated by information; generating, by a reference signal generator, a reference signal that estimates the carrier signal; demodulating the receiver input signal by the reference signal to provide a demodulated signal; evaluating the demodulated signal, by a decision module, to provide a decision module output signal that estimates the carrier signal; wherein the generating of the reference signal comprises: delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal;

wherein the calculating of the weighted sum comprises adding the aligned signals to provide an first sum and multiplying the first sum by a single coefficient to provide the weighted sum of the aligned signals.

15. The method according to claim 14, wherein the decision module is a slicer.

16. The method according to claim 14, comprising normalizing, by a normalizing module of the decision circuit, the decision output signal to provide a normalized output signal that is used to rotate at least some of the delayed receiver input signals.

17. The method according to claim 14, wherein the single coefficient equals 1/L, wherein L is a number of the aligned signals.

18. A method for carrier recovery, the method comprises: receiving a receiver input signal that is representative of an optically coherent signal that was received by the receiver as a result of a transmission, by an optical transmitter, of a transmitter signal that is a carrier signal that is being modulated by information; generating, by a reference signal generator, a reference signal that estimates the carrier signal; demodulating the receiver input signal by the reference signal to provide a demodulated signal; evaluating the demodulated signal, by a decision module, to provide a decision module output signal that estimates the carrier signal; wherein the generating of the reference signal comprises: delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal; wherein the method further comprises receiving by an input module a sequence of receiver input signals;

sending to send to each of carrier recovery module of multiple carrier recovery modules a sub-sequence of receiver input signals;

outputting, by the multiple recovery modules, decision module output signals to an output module; and outputting by the output module, a sequence of decision module output signals.

19. The method according to claim 18, wherein the multiplication and summation module comprises less than L multipliers, wherein L is a number of the aligned signals.

20. The method according to claim 18, wherein the calculating of the weighted sum comprises multiplying the aligned signals by coefficients.

21. The method according to claim 20, comprising calculating, by a coefficient calculator, the coefficients.

22. The method according to claim 21, wherein the calculating of the coefficients comprises receiving the decision module output signal.

23. The method according to claim 21, wherein the calculating of the coefficients comprises applying a Wiener optimization process.

24. The method according to claim 23, wherein the calculating of the coefficients comprises applying a least mean square error optimization process.

25. The method according to claim 23, wherein the calculating of the coefficients comprises calculating a current value of a certain coefficient, the certain coefficient is to be multiplied by a certain aligned signal, in response to a last value of the certain coefficient, a value of the certain aligned signal and a certain delayed receiver input signal that is associated with the certain aligned signal.

26. The method according to claim 18, wherein each subsequence of receiver input signals comprises at least one thousand consecutive input receiver signals.

27. A non-transitory computer readable medium that stores instructions to be executed by a receiver, the instructions are for: receiving a receiver input signal that is representative of an optically coherent signal that was received by the receiver as a result of a transmission, by an optical transmitter, of a transmitter signal that is a carrier signal that is being modulated by information; generating, by a reference signal generator, a reference signal that estimates the carrier signal; demodulating the receiver input signal by the reference signal to provide a demodulated signal; evaluating the demodulated signal, by a decision module, to provide a decision module output signal that estimates the carrier signal; wherein the generating of the reference signal comprises: delaying, by a delay and rotation module, receiver input signals to provide delayed receiver input signals; aligning the delayed receiver input signals by a rotation that is responsive to the decision module output signal thereby providing aligned signals; and calculating, by a multiplication and summation module, a weighted sum of the aligned signals to provide the reference signal; wherein the calculating of the weighted sum comprises adding the aligned signals to provide an first sum and multiplying the first sum by a single coefficient to provide the weighted sum of the aligned signals.

28. The non-transitory computer readable medium according to claim 27 wherein the single coefficient equals 1/L, wherein L is a number of the aligned signals.

* * * * *